(12) United States Patent
Lee

(10) Patent No.: US 11,061,549 B2
(45) Date of Patent: Jul. 13, 2021

(54) DISPLAY APPARATUS, CONTROL APPARATUS, AND OPERATING METHODS THEREOF

(71) Applicant: Samsung Electronics Co., Ltd., Suwon-si (KR)

(72) Inventor: Joo-yoen Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/806,279

(22) Filed: Mar. 2, 2020

(65) Prior Publication Data

US 2020/0201530 A1 Jun. 25, 2020

Related U.S. Application Data

(62) Division of application No. 14/960,533, filed on Dec. 7, 2015, now Pat. No. 10,579,242.

(30) Foreign Application Priority Data

Jan. 22, 2015 (KR) ........................ 10-2015-0010554

(51) Int. Cl.
*G06F 3/0484* (2013.01)
*H04N 21/41* (2011.01)
(Continued)

(52) U.S. Cl.
CPC ...... *G06F 3/04847* (2013.01); *G06F 3/04842* (2013.01); *H04N 21/4126* (2013.01);
(Continued)

(58) Field of Classification Search
None
See application file for complete search history.

(56) References Cited

U.S. PATENT DOCUMENTS 9,226,020 B2 12/2015 Kim et al.
2005/0262535 A1* 11/2005 Uchida .............. H04N 21/4126
725/80

(Continued)

FOREIGN PATENT DOCUMENTS

| CN | 102769725 | 11/2012 |
| CN | 102870425 | 1/2013 |

(Continued)

OTHER PUBLICATIONS

European Search Report dated Mar. 14, 2016 in European Patent Application No. 15 200 952.8.

(Continued)

*Primary Examiner* — Jeanette J Parker
(74) *Attorney, Agent, or Firm* — Staas & Halsey LLP

(57) ABSTRACT

A display apparatus including a display unit, a control apparatus, and a method are provided. The display apparatus includes a controller is configured to obtain a status signal from the control apparatus, to select, based on the obtained status signal, a mode from among a user interface (UI) display limit mode and a UI display mode, wherein the UI display limit mode limits displaying a UI to control an output from the display apparatus on the display unit and the UI display mode does not limit displaying the UI on the display unit, and to operate the display unit in the selected mode.

12 Claims, 16 Drawing Sheets

(51) Int. Cl.
*H04N 21/431* (2011.01)
*H04N 21/422* (2011.01)
*H04N 21/637* (2011.01)

(52) U.S. Cl.
CPC ..... *H04N 21/42208* (2013.01); *H04N 21/431* (2013.01); *H04N 21/637* (2013.01); *H04N 21/42202* (2013.01)

(56) References Cited

U.S. PATENT DOCUMENTS

| | | | |
|---|---|---|---|
| 2008/0122990 A1 | 5/2008 | Rumreich | |
| 2008/0284907 A1 | 11/2008 | Chiao | |
| 2009/0100474 A1 | 4/2009 | Migos | |
| 2009/0256847 A1 | 10/2009 | Hayashi | |
| 2010/0165199 A1 | 7/2010 | Lee | |
| 2011/0231872 A1 | 9/2011 | Gharachorloo et al. | |
| 2011/0267291 A1 | 11/2011 | Choi et al. | |
| 2012/0050183 A1* | 3/2012 | Lee | G06F 3/1423 345/173 |
| 2013/0007793 A1 | 1/2013 | Anthru et al. | |
| 2013/0152135 A1* | 6/2013 | Hong | H04N 21/4622 725/51 |
| 2013/0162502 A1* | 6/2013 | Lee | H04N 21/42204 345/1.2 |
| 2014/0028918 A1* | 1/2014 | Kim | H04N 21/4222 348/564 |
| 2014/0122996 A1 | 5/2014 | Gupta et al. | |
| 2014/0156030 A1 | 6/2014 | Okamoto et al. | |
| 2014/0189601 A1 | 7/2014 | Kim et al. | |
| 2014/0198044 A1 | 7/2014 | Wang et al. | |
| 2014/0211088 A1* | 7/2014 | Arai | H04N 21/43637 348/552 |
| 2015/0381798 A1* | 12/2015 | Yoon | H04W 52/0254 455/411 |
| 2016/0086554 A1* | 3/2016 | Suzuki | G06F 1/1626 345/690 |

FOREIGN PATENT DOCUMENTS

| | | |
|---|---|---|
| CN | 103533413 | 1/2014 |
| EP | 2472892 | 7/2012 |
| EP | 2 521 374 A2 | 11/2012 |
| JP | 2001-61110 | 3/2001 |
| JP | 2007-37022 | 2/2007 |
| JP | 2008-160412 | 7/2008 |
| JP | 2010-239214 | 10/2010 |
| JP | 2011-35697 | 2/2011 |
| JP | 2011-112583 | 6/2011 |
| KR | 10-0508580 | 7/2004 |
| KR | 10-0793798 | 7/2007 |
| KR | 10-2010-0133244 | 12/2010 |
| KR | 10-2011-0120132 | 11/2011 |
| KR | 10-2014-0085061 | 7/2014 |
| WO | 2013/121249 | 8/2013 |

OTHER PUBLICATIONS

Office Action dated Apr. 6, 2016 in European Patent Application No. 15 200 952.8.
Summons to Attend Oral Proceedings issued on Nov. 28, 2016 in corresponding European Patent Application No. 15 200 952.8.
U.S. Office Action dated Dec. 8, 2017 in U.S. Appl. No. 14/960,533.
U.S. Office Action dated May 21, 2018 in U.S. Appl. No. 14/960,533.
U.S. Office Action dated Nov. 13, 2018 in U.S. Appl. No. 14/960,533.
U.S. Office Action dated Jun. 18, 2019 in U.S. Appl. No. 14/960,533.
U.S. Advisory Action dated Feb. 1, 2019 in U.S. Appl. No. 14/960,533.
U.S. Notice of Allowance dated Oct. 18, 2019 in U.S. Appl. No. 14/960,533.
Chinese Office Action dated Apr. 4, 2018 in Chinese Patent Application No. 201610037145.8.
Partial European Search Report dated Feb. 9, 2018 in European Patent Application No. 17191574.7.
U.S. Appl. No. 14/960,533, filed Dec. 7, 2015, Joo-yoen Lee, Samsung Electronics Co., Ltd.
Korean Office Action dated Aug. 31, 2020 in Korean Patent Application No. 10-2015-0010554.

\* cited by examiner

DISPLAY APPARATUS, CONTROL APPARATUS, AND OPERATING METHODS THEREOF

CROSS-REFERENCE TO RELATED APPLICATIONS

This application is a divisional application of U.S. patent application Ser. No. 14/960,533, filed on Dec. 7, 2015, which is related to, and claims the priority benefit of, Korean Patent Application No. 10-2015-0010554, filed on Jan. 22, 2015, in the Korean Intellectual Property Office, the disclosure of which is incorporated herein in its entirety by reference.

BACKGROUND

1. Field

The present disclosure relates to a display apparatus, a control apparatus, and operating methods thereof, and more particularly, to a control apparatus including a display unit, a display apparatus that may be efficiently controlled using the control apparatus, and operating methods thereof.

2. Description of the Related Art

A display apparatus is an apparatus having a function of displaying an image viewable to a user. For example, in the past, a television (TV) apparatus, which is an example of the display apparatus, functioned only to uni-directionally receive a broadcasting signal broadcast from a broadcasting station and to display a broadcasting image. However, recently, TV apparatuses have not only a function of outputting a broadcasting image transmitted from a broadcasting station but also a function of outputting various types of image content. Also, due to developments in display apparatuses, various types of control apparatuses capable of remotely controlling the display apparatuses have been developed. However, when different types of control apparatuses may be used to control a display apparatus, a method of controlling the display apparatus may be problematic.

SUMMARY

A control apparatus including a display unit, a display apparatus to be efficiently controlled by using the control apparatus, and operating methods thereof are provided.

Additional aspects will be set forth in part in the description which follows and, in part, will be apparent from the description, or may be learned by practice of the presented exemplary embodiments.

According to an aspect of an exemplary embodiment, a display apparatus includes a display unit, and a controller is configured to obtain a status signal from a control apparatus, to select, based on the obtained status signal, a mode from among a user interface (UI) display limit mode and a UI display mode, wherein the UI display limit mode limits displaying a UI to control an output from the display apparatus on the display unit and the UI display mode does not limit displaying the UI on the display unit, and to operate the display unit in the selected mode.

When the status signal indicates an activation of the control apparatus, the controller may be configured to operate the display unit in the UI display limit mode that limits displaying the UI on the display unit.

The display apparatus may include a communication unit that receives, from the control apparatus, a control signal to control an output from the display unit, and when the control signal is received while the display unit operates in the UI display limit mode, the controller may be configured to control the output from the display unit, based on the control signal.

The display apparatus may include a communication unit that receives, from a second control apparatus, a second control signal to control an output from the display unit, and when the second control signal is received while the display unit operates in the UI display limit mode, the controller may be configured to block the second control signal.

When the status signal indicates inactivation of the control apparatus, the controller may be configured to control the display unit to operate in the UI display mode that does not limit displaying the UI on the display unit.

The display apparatus may include a communication unit that receives, from a second control apparatus, a second control signal to control an output from the display unit, and when the second control signal is received while the display unit operates in the UI display mode, the controller may be further configured to control the output from the display unit, based on the second control signal.

The controller may be configured to obtain the status signal by sensing an on or off status of a display unit of the control apparatus.

The display apparatus may include a communication unit that receives the status signal from the control apparatus.

According to an aspect of an exemplary embodiment, a control apparatus includes a display unit, a communication unit that transmits, to a display apparatus, a status signal indicating whether a control function is activated, and a controller that controls, based on the status signal, the display unit to output a user interface (UI) that controls an output from the display apparatus.

The control apparatus may further include an input unit that receives, from a user, a control signal to manipulate the display apparatus, and the communication unit may be configured to transmit the control signal to the display apparatus.

Whether the control function is activated may be determined according to an on or off status of the display unit.

The display unit may be configured to be turned off according to a command of the user that is input via the input unit, or may be configured to be turned off if the control apparatus does not receive an input from the user via the input unit for a preset time period.

The control apparatus may include a memory that stores information for outputting the UI.

According to an aspect of an exemplary embodiment, an operating method of a display apparatus includes obtaining, from a control apparatus, a status signal indicating, for example, whether the control apparatus is activated, selecting, based on the obtained status signal, a mode from among a user interface (UI) display limit mode and a UI display mode, wherein the UI display limit mode limits displaying a UI on a display unit and the UI display mode does not limit displaying the UI on the display unit, and operating the display unit in the selected mode.

When the status signal indicates activation of the control apparatus, the selecting may include selecting the UI display limit mode that limits displaying the UI on the display unit.

The operating method may include, while the display unit operates in the UI display limit mode, receiving, from the control apparatus, a control signal to control an output from the display unit; and controlling the output from the display unit, based on the control signal.

The operating method may include, while the display unit operates in the UI display limit mode, receiving, from a second control apparatus, a second control signal to control an output from the display unit; and blocking the second control signal.

When the status signal indicates inactivation of the control apparatus, the selecting may include selecting the UI display mode that does not limit displaying the UI on the display unit.

The operating method may include, while the display unit operates in the UI display mode, receiving, from a second control apparatus, a second control signal to control an output from the display unit, and controlling the output from the display unit, based on the second control signal.

According to an aspect of another an exemplary embodiment, an operating method of a display apparatus connectable to a plurality of control apparatuses includes obtaining a status signal from at least two of the plurality of control apparatuses connected to the display apparatus, determining if one the connected control apparatuses includes a display unit based on the obtained status signal, and prioritizing a control of the display apparatus to be controlled by the control apparatus including the determined display unit.

The prioritizing the control may be automatic.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
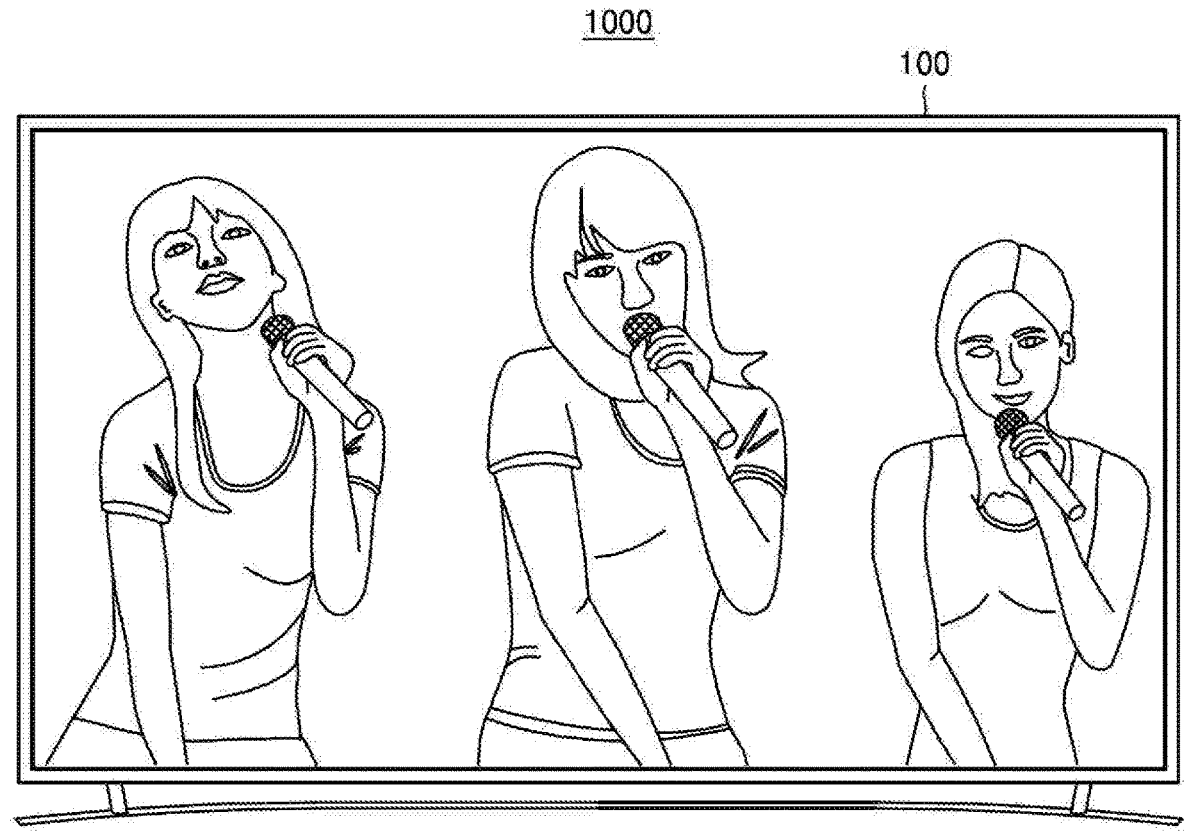
FIG. 1 illustrates a configuration of a display system, according to at least one exemplary embodiment.
Figure 1:
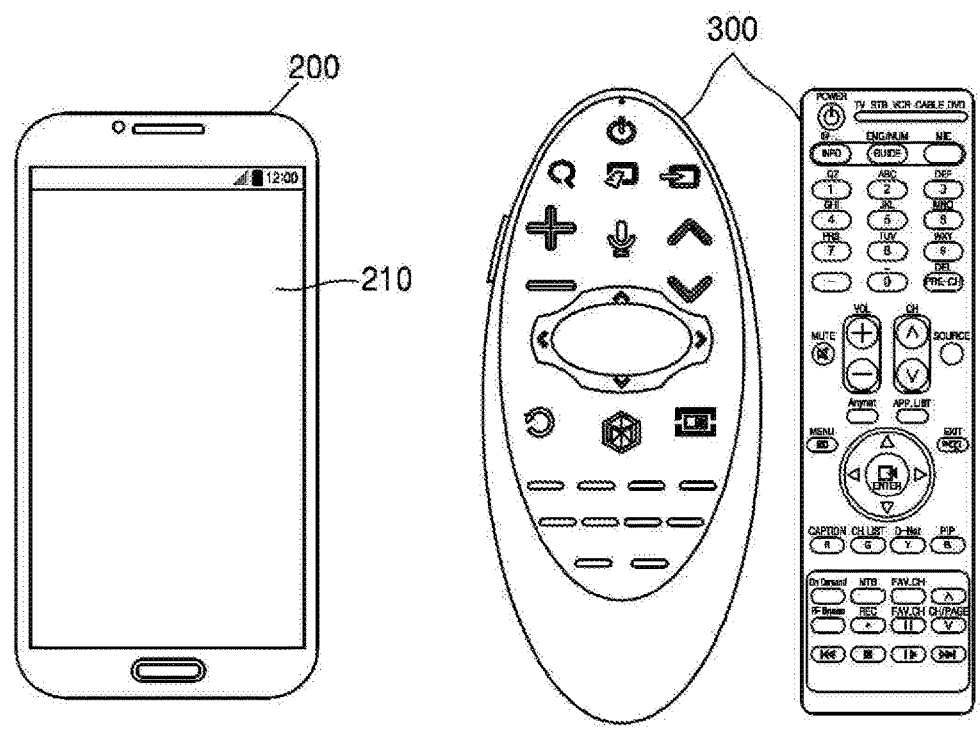

Reference will now be made in detail to the embodiments, examples of which are illustrated in the accompanying drawings, wherein like reference numerals refer to the like elements throughout. The embodiments are described below to explain the present invention by referring to the figures.

Advantages and features of the inventive concept and methods of accomplishing the same may be understood by reference to the detailed description of exemplary embodiments and the accompanying drawings. The inventive concept may, however, be embodied in many different forms and should not be construed as being limited to the exemplary embodiments set forth herein.

Terms, including descriptive or technical terms, used herein should be construed as having meanings that are in accordance with the art. Also, some terms may be defined herein.

Expressions such as "at least one of," when preceding a list of elements, modify the entire list of elements and do not modify the individual elements of the list.

FIG. 1 illustrates a configuration of a display system 1000, according to at least one exemplary embodiment.

Referring to FIG. 1, the display system 1000 may include a display apparatus 100 and a plurality of control apparatuses 200 and 300. The plurality of control apparatuses 200 and 300 are apparatuses capable of controlling the display apparatus 100.

The display apparatus 100 may output image content. The display apparatus 100 may receive the image content from a broadcasting station, a server connected via a network, an external device connected in a wired or wireless manner, a storage unit included in the display apparatus 100, or the like. The image content may include video data and may further include audio data. The display apparatus 100 may output a user interface (UI) that displays a graphic item to receive a user input to manipulate the display apparatus 100 from a user, or displays a graphic item indicating a current state of the display apparatus 100. The user may select the graphic item by using the control apparatuses 200 and 300. For example, the UI may be, but is not limited to, an on-screen display (OSD) menu, program information, an electronic program guide (EPG), an application icon, an application window, a UI window, or a web browsing window.

The display apparatus 100 may be embodied as one of various display apparatuses including a liquid crystal display (LCD) display, a cathode ray tube (CRT) display, a plasma display panel (PDP) display, an organic light-emitting diode (OLED) display, a field emission display (FED) display, a light-emitting diode (LED) display, a vacuum fluorescent display (VFD) display, a digital light processing (DLP) display, a flat panel display (FPD) display, a three-dimensional (3D) display, a transparent display, or the like.

The plurality of control apparatuses 200 and 300 may control the display apparatus 100 by using various communication methods. Examples of the communication methods may include, but are not limited to, a wireless local area network (wireless LAN), Bluetooth, ZigBee, Wi-Fi Direct (WFD), ultra wideband (UWB), infrared data association (IrDA), Bluetooth Low Energy (BLE), near field communication (NFC), or the like.

The plurality of control apparatuses 200 and 300 may turn a power of the display apparatus 100 on and/or off, may change a channel of the display apparatus 100, may adjust a volume of the display apparatus 100, may select a type of broadcasting including terrestrial broadcasts, cable broadcasts, satellite broadcasts, etc., and/or may variously control an output from the display apparatus 100 via environment settings, etc. The plurality of control apparatuses 200 and 300 may control the display apparatus 100, based on an input from the user.

The plurality of control apparatuses 200 and 300 may be classified as the control apparatus 200 and the control apparatus 300 (also referred to as 'the second control apparatus 300'), according to whether a display unit is included.

The control apparatus 200 indicates a control apparatus that includes a display unit 210. According to an exemplary embodiment, the control apparatus 200 may be embodied as an independent apparatus designed to control the display apparatus 100. According to an exemplary embodiment, the control apparatus 200 may be embodied as one of various electronic apparatuses including smart devices such as a smartphone, a tablet computer, etc., a portable electronic apparatus, a wearable device, a home terminal that is connectable to a home network, or the like.

The second control apparatus 300 may be a control apparatus that does not include a display unit. Examples of the second control apparatus 300 include, but are not limited to, a TV remote controller, a pointer, a mouse, a motion recognizer, or the like.

Figure 2:
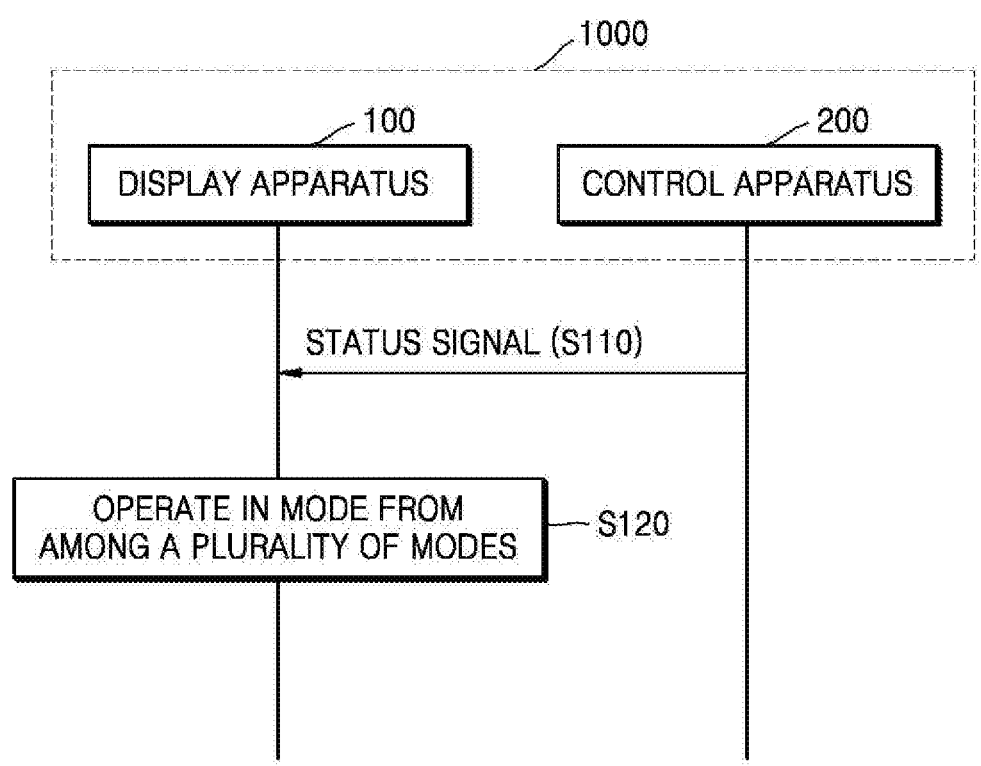
FIG. 2 is a flowchart of an operating method of the display system of FIG. 1, according to at least one exemplary embodiment.

FIG. 2 is a flowchart of an operating method of the display system 1000 of FIG. 1, according to at least one exemplary embodiment.

Referring to FIGS. 1 and 2, the display apparatus 100 may obtain a status signal. The status signal may indicate, for example, whether the control apparatus 200 is activated, from the control apparatus 200 including the display unit 210 (S110). When the control apparatus 200 is activated, a user may control the display apparatus 100 by using the control apparatus 200.

The display apparatus 100 may select, based on the status signal, a mode from among a plurality of modes that are categorized according to whether a UI display is limited or not, and may operate in the selected mode (S120). The plurality of modes may include a UI display limit mode that limits a UI display and a UI display mode that does not limit the UI display. The UI display limit mode is an operation mode during which the display apparatus 100 does not output a UI provided for manipulation of the display apparatus 100, or limits an output of the UI.

During the UI display limit mode, the display apparatus 100 may output only image content. Alternatively, during the UI display limit mode, the display apparatus 100 may output image content and only a part of a UI related to the image content. The UI display mode is an operation mode during which the display apparatus 100 does not limit an output of a UI.

When the obtained status signal indicates, for example, that the control apparatus 200 is inactivated, the display apparatus 100 may operate in the UI display mode.

When the obtained status signal indicates, for example, that the control apparatus 200 is activated, the display apparatus 100 may operate in the UI display limit mode. While the display apparatus 100 operates in the UI display limit mode, the display unit 210 of the control apparatus 200 may output a UI for manipulation of the display apparatus 100. The UI displayed on the display unit 210 of the control apparatus 200 may be displayed based on information received from the display apparatus 100, or may be displayed based on image information pre-stored in the control apparatus 200. Therefore, while the user manipulates the display apparatus 100 by using the UI that is output to the control apparatus 200, the display apparatus 100 may output only image content, or may output the image content and only some graphical objects related to the image content. For example, some graphical objects related to the image content may include a subtitle that corresponds to the image content, information that describes the image content, or the like.

Accordingly, the user may watch the image content that is not obstructed by the UI, and thus, a level of satisfaction of the user may be increased.

Figure 3:
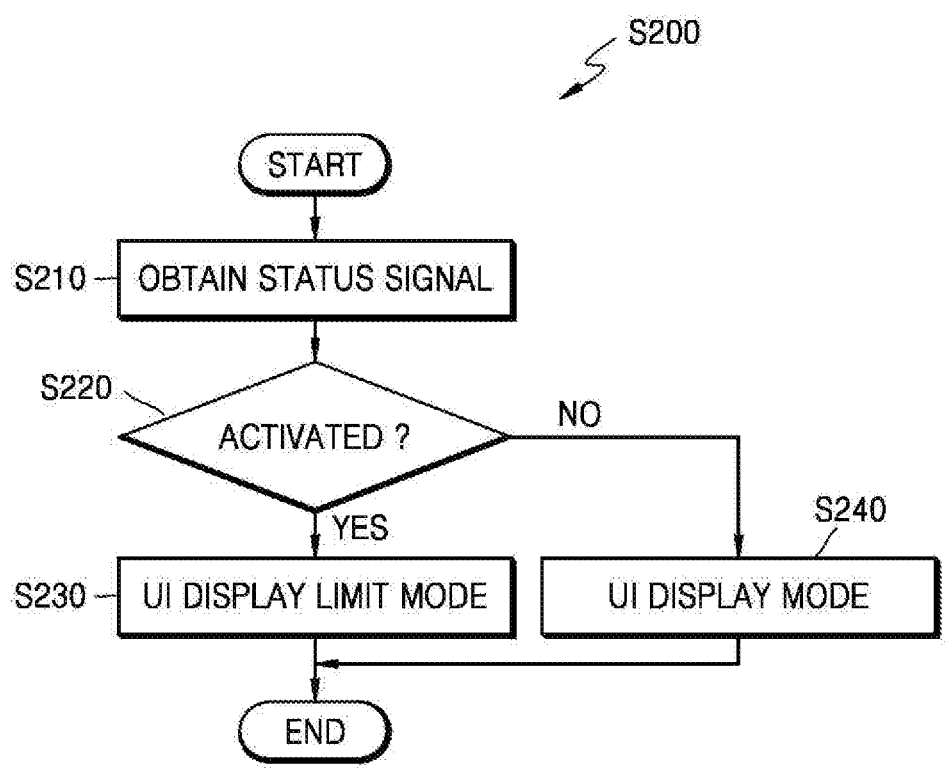
FIG. 3 is a flowchart of an operating method of the display apparatus of FIG. 1, according to at least one exemplary embodiment.

FIG. 3 is a flowchart of an operating method S200 of the display apparatus 100 of FIG. 1, according to at least one exemplary embodiment. Referring to FIGS. 1 and 3, the display apparatus 100 may obtain a status signal indicating, for example, whether the control apparatus 200 including the display unit 210 is activated (S210). The display apparatus 100 may determine, based on the status signal, whether the control apparatus 200 is activated (S220).

The control apparatus 200 may be activated or inactivated according to a user input. The control apparatus 200 may receive, from the user, an input for selecting whether to activate the control apparatus 200.

According to an exemplary embodiment, the control apparatus 200 may be activated or inactivated by turning on or off power of the control apparatus 200. For example, similar to an infrared (IR) remote controller that is activated by turning on power of the IR remote controller and is inactivated by turning off the power of the IR remote controller, the control apparatus 200 may be activated or inactivated by turning on or off the power of the control apparatus 200.

According to an exemplary embodiment, the control apparatus 200 may be activated or inactivated by turning on or off the display unit 210 of the control apparatus 200. For example, in a case of a general smartphone, when the smartphone is used while power of the smartphone is turned on, power of a display unit may be turned on, and when the smartphone is not used, the power of the display unit may be turned off and the smartphone may enter a standby mode. When a user wants to use the smartphone, the user may turn on the power of the display unit of the smartphone and thus may use the smartphone. The control apparatus 200 may be embodied in a similar manner to the activated or inactivated status of the smartphone, and thus, the control apparatus 200 may be activated by turning on power of the display unit 210 while the power of the control apparatus 200 is turned on. When the control apparatus 200 enters a standby mode or the power of the display unit 210 of the control apparatus 200 is turned off, the control apparatus 200 may be inactivated. The status signal may correspond to information about an on or off status of the display unit 210.

When the power of the control apparatus 200 or the display unit 210 is turned on, the control apparatus 200 may be activated. On the other hand, when the power of the control apparatus 200 or the display unit 210 is turned off, the control apparatus 200 may be inactivated. Whether to turn the power of the control apparatus 200 or the display unit 210 on or off may be determined, for example, based on an input from the user. The control apparatus 200 may receive, from the user, an input for commanding to turn on or off the power of the display unit 210. Alternatively, if the control apparatus 200 does not receive any input from the user for a preset time period, the power of the display unit 210 may be turned off.

According to an exemplary embodiment, when the control apparatus 200 is a generally-used electronic apparatus such as a smartphone or a tablet PC, activation or inactivation of a control function to control the control apparatus 200 may be realized by using a signal that is different from a signal for turning on or off a power or a display unit of the smartphone or the tablet PC. For example, if the control apparatus 200 is a generally-used electronic apparatus, an application may be separately arranged to indicate activation or inactivation of a display apparatus control function. For example, an application item for activation or inactivation of a display apparatus control function may be included in a menu of the control apparatus 200 that is embodied as a smartphone, and a user may activate the display apparatus control function by selecting the application item or may inactivate the display apparatus control function by deselecting the application item.

According to an embodiment, when activation of the control apparatus 200 is determined, the control apparatus 200 may obtain the status signal indicating whether the control apparatus 200 is activated, and may transmit the status signal to the display apparatus 100. The status signal may include mode selection information indicating in which mode the display apparatus 100 is to operate from among the plurality of modes. The display apparatus 100 may obtain the status signal by receiving the status signal. The status signal may be transmitted or received via short-distance communication.

The status signal may be a physical signal such as light, sound, or a motion. The display apparatus 100 may obtain the status signal by sensing the status signal output from the control apparatus 200. The display apparatus 100 may include a sensor capable of sensing the status signal. The control apparatus 200 may monitor whether the status signal is sensed, for example, according to predefined rules.

For example, the status signal may indicate a presence or absence of light due to the on or off status of the display unit 210. The display apparatus 100 may sense the light emitted from the turned-on display unit 210, and thus may obtain the sensed light as the status signal. When the display apparatus 100 senses the light, the display apparatus 100 may determine that the display unit 210 is turned on and the control apparatus 200 is activated. When the display apparatus 100 does not sense the light emitted from the display unit 210 of the control apparatus 200, the display apparatus 100 may determine that the display unit 210 is turned off and the control apparatus 200 is inactivated.

When the display apparatus 100 determines that the control apparatus 200 is activated, the display apparatus 100 may operate in the UI display limit mode (S230). When the display apparatus 100 determines that the control apparatus 200 is inactivated, the display apparatus 100 may operate in the UI display mode (S240).

Figure 4:
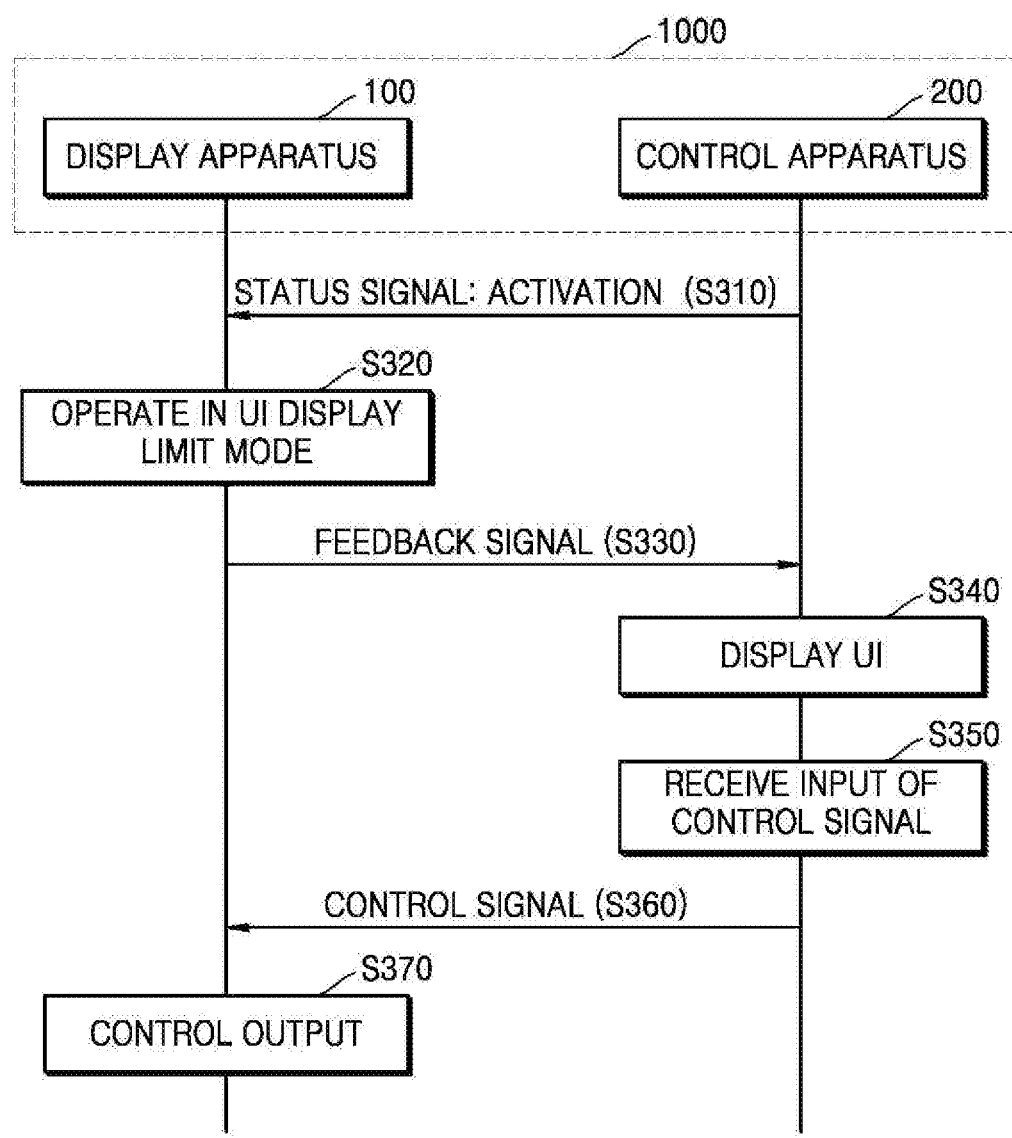
FIG. 4 is a flowchart of an operating method of the display system of FIG. 1, according to at least one exemplary embodiment.

FIG. 4 is a flowchart of an operating method of the display system 1000 of FIG. 1, according to at least one exemplary embodiment.

Referring to FIGS. 1 and 4, the display apparatus 100 may obtain a status signal indicating, for example, activation of the control apparatus 200 including the display unit 210 (S310). The display apparatus 100 may operate in the UI display limit mode (S320).

The display apparatus 100 may transmit a feedback signal to the control apparatus 200 (S330). The feedback signal may be a signal to notify the control apparatus 200 that the display apparatus 100 operates in the UI display limit mode. The transmission of the feedback signal may be skipped.

The display unit 210 of the control apparatus 200 may display a UI for manipulation of the display apparatus 100 (S340). The control apparatus 200 may determine a UI to be displayed on the display unit 210, based on the feedback signal, and may output the determined UI. The output UI may be received in real-time from the display apparatus 100. The UI may be output based on the image information pre-stored in the control apparatus 200.

The control apparatus 200 may receive, from a user, an input of a control signal to control an output from the display apparatus 100 (S350). The control signal may turn on or off the power of the display apparatus 100, may change a channel of the display apparatus 100, may adjust a volume of the display apparatus 100, may change a type of broadcasting from among terrestrial broadcasts, cable broadcasts, satellite broadcasts, or the like, or may be a command for setting a configuration, but examples of the control signal are not limited thereto.

The control apparatus 200 may transmit the control signal to the display apparatus 100 (S360). The display apparatus 100 may control the output from the display apparatus 100, based on the control signal (S370).

Figure 5:
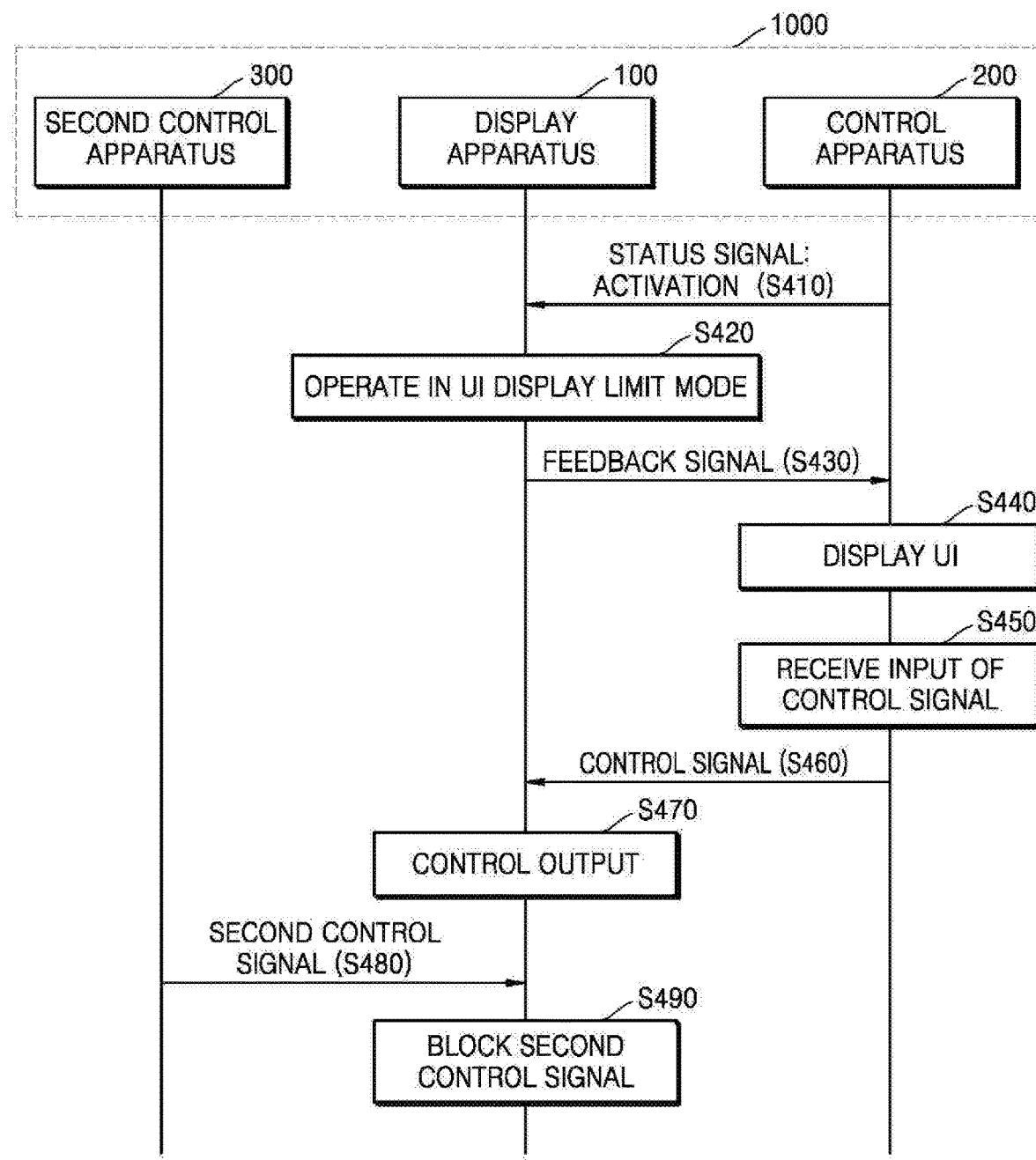
FIG. 5 is a flowchart of an operating method of the display system of FIG. 1, according to at least one exemplary embodiment.

FIG. 5 is a flowchart of an operating method of the display system 1000 of FIG. 1, according to at least one exemplary embodiment.

Referring to FIGS. 1 and 5, the display apparatus 100 may obtain a status signal indicating, for example, activation of the control apparatus 200 including the display unit 210 (S410). The display apparatus 100 may operate in the UI display limit mode (S420). The display apparatus 100 may transmit a feedback signal to the control apparatus 200 (S430). The display unit 210 of the control apparatus 200 may display a UI for manipulation of the display apparatus 100 (S440). The control apparatus 200 may receive, from a user, an input of a control signal to control an output from the display apparatus 100 (S450). The control apparatus 200 may transmit the control signal to the display apparatus 100 (S460). The display apparatus 100 may control the output from the display apparatus 100, based on the control signal (S470). Descriptions with respect to operations S310 through S370 of FIG. 4 may be applied to operations S410 through S470.

The second control apparatus 300 that does not include a display unit may transmit a second control signal to the display apparatus 100 (S480). The second control signal may be a signal that commands that the display apparatus 100 be controlled.

If the second control signal is transmitted from the second control apparatus 300 to the display apparatus 100 while the display apparatus 100 operates in the UI display limit mode, the display apparatus 100 may block the second control signal (S490). That is, the display apparatus 100 may ignore the second control signal and thus may prevent the display apparatus 100 from being controlled according to the second control signal.

The display apparatus 100 may determine whether to block the second control signal, for example, according to types of the second control signal. The types of the second control signal may depend on whether it is required for the display apparatus 100 to output a UI or not. If the second control signal is a signal for commanding the display apparatus 100 to output a UI, the display apparatus 100 may block the second control signal. For example, the second control signal for commanding the display apparatus 100 to output the UI may be a signal for commanding that a search window for searching for image content be output, or may be signal for commanding that a list window showing a list of a plurality of pieces of image content be output.

If the second control signal is a signal to control the display apparatus 100 without outputting a UI to the display apparatus 100, the display apparatus 100 may not block the second control signal, and may control the display apparatus 100 according to the second control signal. For example, the second control signal to control the display apparatus 100 without outputting a UI to the display apparatus 100 may be a signal for turning on or off the power of the display apparatus 100, a signal for changing a channel of the display apparatus 100, a signal for adjusting a volume of the display apparatus 100, or the like.

Figure 6:
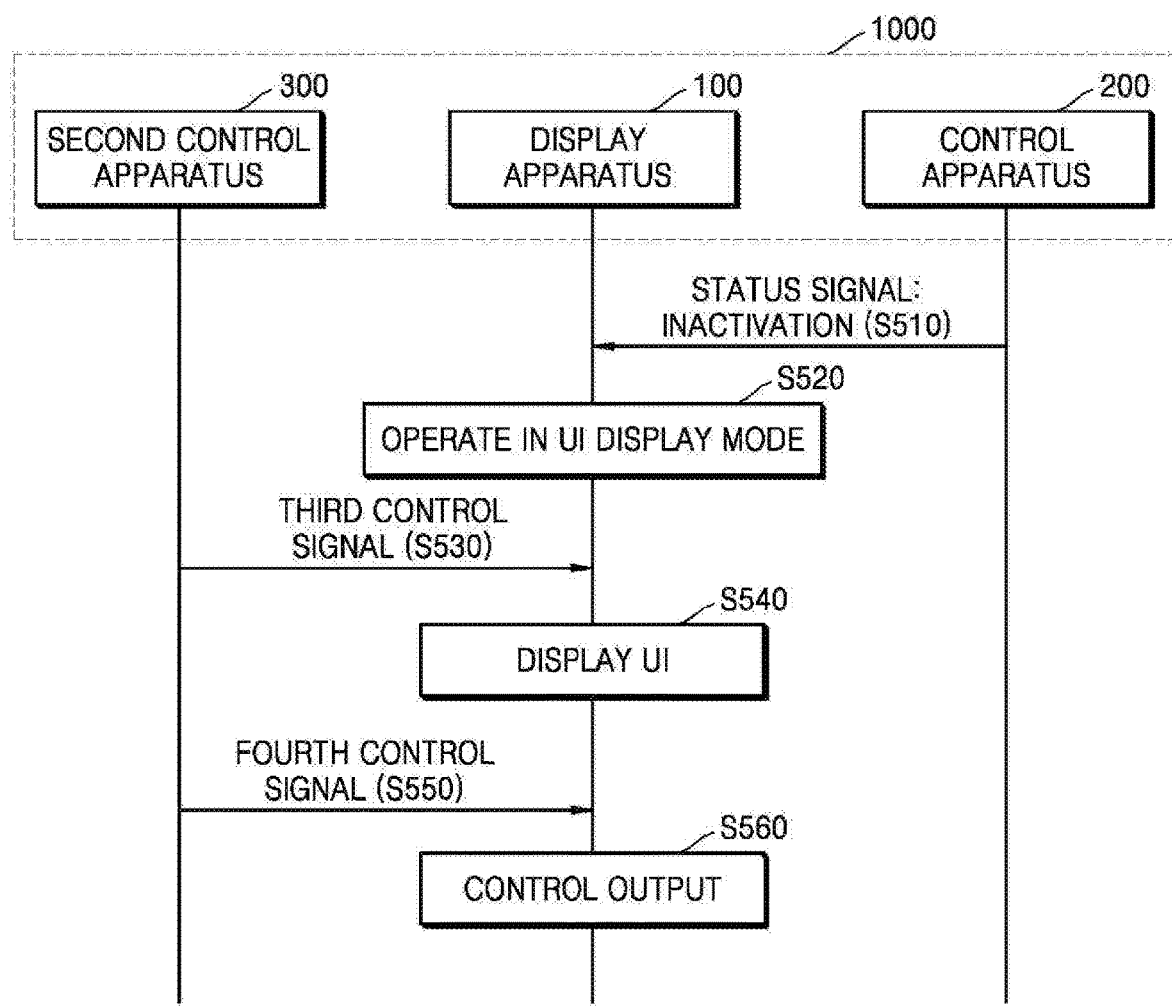
FIG. 6 is a flowchart of an operating method of the display system of FIG. 1, according to at least one exemplary embodiment.

FIG. 6 is a flowchart of an operating method of the display system 1000 of FIG. 1, according to at least one exemplary embodiment.

Referring to FIGS. 1 and 6, the display apparatus 100 may obtain a status signal indicating, for example, inactivation of the control apparatus 200 including the display unit 210 (S510). The display apparatus 100 may operate in the UI display mode (S520).

The second control apparatus 300 that does not include a display unit may transmit a third control signal to control the display apparatus 100 to the display apparatus 100 (S530). The third control signal may be a signal that commands the display apparatus 100 to output a UI. The third control signal may include information indicating a type of the UI to be output to the display apparatus 100. The display apparatus 100 may display the UI, based on the third control signal (S540).

The second control apparatus 300 may transmit a fourth control signal to the display apparatus 100 (S550). The fourth control signal may be a signal for commanding execution of a function related to the UI that is output to the display apparatus 100 according to the third control signal. For example, if the output UI is a search window, the fourth control signal may include a text to be input to the search window. if the output UI is a list window showing a list of a plurality of pieces of image content, the fourth control signal may be a signal for selecting one piece of image content from the list window. However, a type of the fourth control signal is not limited thereto, and the fourth control signal may be one of various types of a signal to control the display apparatus 100.

The display apparatus 100 may control an output from the display apparatus 100, based on the fourth control signal (S560). The second control apparatus 300 may obtain each of the third control signal and the fourth control signal, based on inputs by the user.

As described with reference to FIGS. 5 and 6, the control apparatus 200 including the display unit 210 may have a priority of controlling the display apparatus 100, over the second control apparatus 300. That is, as described with reference to FIG. 5, in a case where the control apparatus 200 including the display unit 210 is activated and thus the display apparatus 100 operates in the UI display limit mode, the second control apparatus 300 cannot control the display apparatus 100. According to an embodiment, in this case, only the control apparatus 200 can control the display apparatus 100. As described with reference to FIG. 6, in a case where the control apparatus 200 is inactivated and thus the display apparatus 100 operates in the UI display mode, the second control apparatus 300, for example, can control the display apparatus 100.

Figure 7:
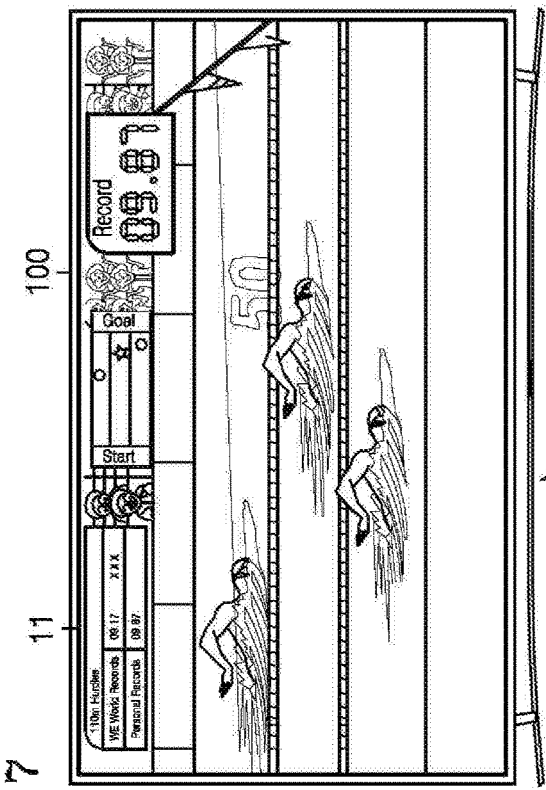
FIG. 7 illustrates an example in which the display apparatus that operates in a user interface (UI) display mode changes its mode to a UI display limit mode.
Figure 7:
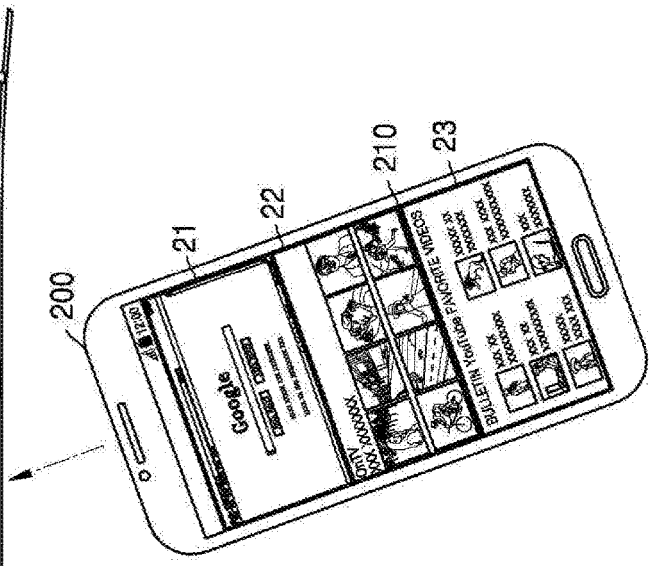
Figure 7:
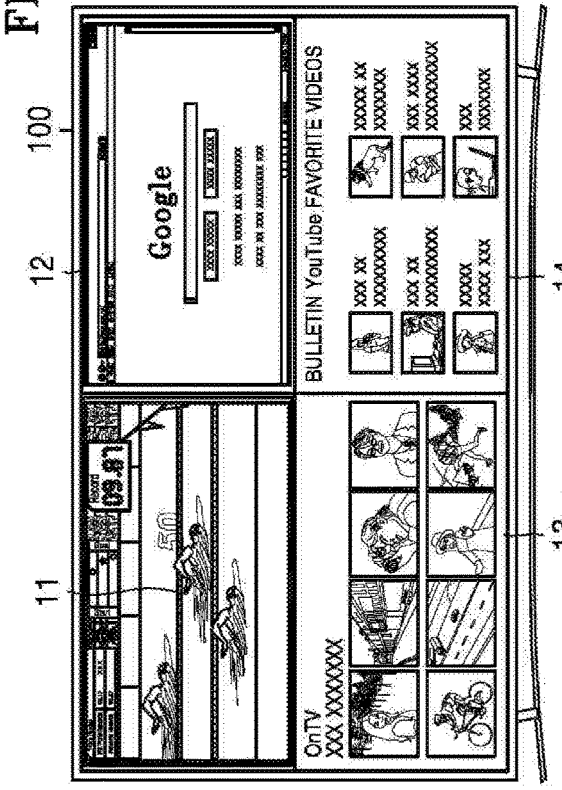
Figure 7:
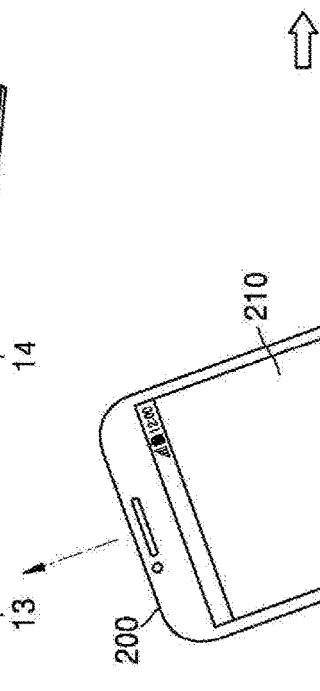

FIG. 7 illustrates an example in which the display apparatus 100 that operates in the UI display mode changes its mode to the UI display limit mode.

Referring to FIG. 7, the display apparatus 100 that operates in the UI display mode may output, for example, not only image content 11 but also may output UIs 12, 13, and 14. For example, while the display apparatus 100 outputs only the image content 11, the display apparatus 100 may receive the third control signal from the second control apparatus 300 (as illustrated in FIG. 1) as described, for example, with reference to S530 of FIG. 6. The display apparatus 100 may display the UIs 12, 13, and 14, based on the third control signal (refer to S540 of FIG. 6).

For example, the UIs 12, 13, and 14 may be used in selecting image content to be output by the display apparatus 100. As examples of the UIs 12, 13, and 14, FIG. 7 illustrates the UI 12 for providing a web browsing window for browsing image content on the Internet, the UI 13 to receive an input for selecting a TV broadcasting program, and the UI 14 to receive an input for selecting image content delivered from an external apparatus other than a TV signal, or selecting image content stored in the display apparatus 100. FIG. 7 illustrates examples of the UIs 12, 13, and 14, but types of the UIs 12, 13, and 14 are not limited thereto. The display apparatus 100 may display UIs that are variously implemented to control the display apparatus 100. The display apparatus 100 may support multiple screens as illustrated in FIG. 7.

The display apparatus 100 that operates in the UI display mode may change a UI displayed on the display apparatus 100, based on a user input via the second control apparatus 300 (refer to FIG. 1), or may change a screen of the display apparatus 100 so as to output image content selected according to a user input. The display apparatus 100 may be changed from the UI display mode to the UI display limit mode.

The display apparatus 100 that operates in the UI display mode and thus outputs the image content 11 and the UIs 12, 13, and 14 may receive a status signal indicating that the control apparatus 200 has been activated. The display apparatus 100 may change its mode to the UI display limit mode and thus may change its screen so as to output only the image content 11.

The display unit 210 of the activated control apparatus 200 may display UIs 21, 22, and 23 for manipulation of the display apparatus 100. As examples of the UIs 21, 22, and 23, FIG. 7 illustrates the UI 21 for providing a web browsing window for browsing image content on the Internet, the UI 22 to receive an input of selecting a TV broadcasting program, and the UI 23 to receive an input for selecting image content delivered from an external apparatus other than a TV signal, or selecting image content stored in the control apparatus 200 or the display apparatus 100. The UIs 21, 22, and 23 that are output to the control apparatus 200 may correspond to the UIs 12, 13, and 14 that are output by the display apparatus 100 before the display apparatus 100 changes its mode to the UI display limit mode. The UIs 21, 22, and 23 that are output to the display unit 210 of the control apparatus 200 may be used in selecting image content to be output by the display apparatus 100. FIG. 7 illustrates examples of the UIs 21, 22, and 23, and thus types of the UIs 21, 22, and 23 are not limited thereto. The display unit 210 may display UIs that are variously implemented to control the display apparatus 100. A UI displayed on the display unit 210 may be changed, based on a user input. The control apparatus 200 may support multiple screens as illustrated in FIG. 7.

Figure 8:
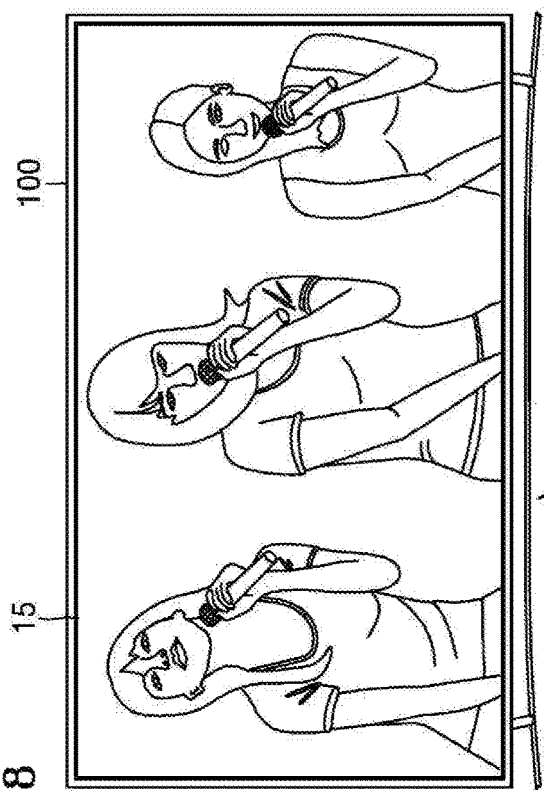
FIG. 8 illustrates examples of the display apparatus that operates in the UI display limit mode and a control apparatus that controls the display apparatus.
Figure 8:
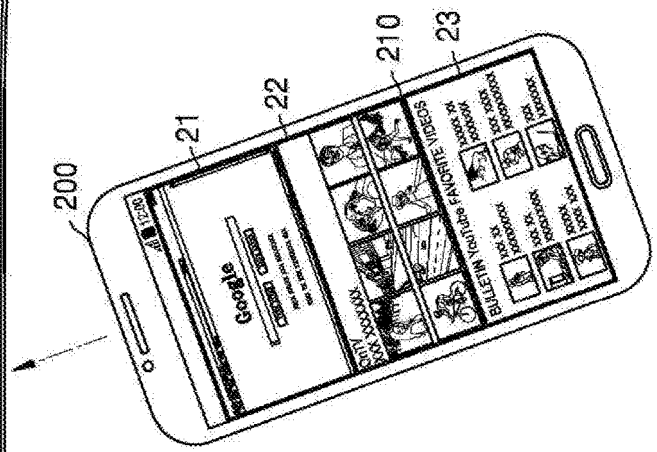
Figure 8:
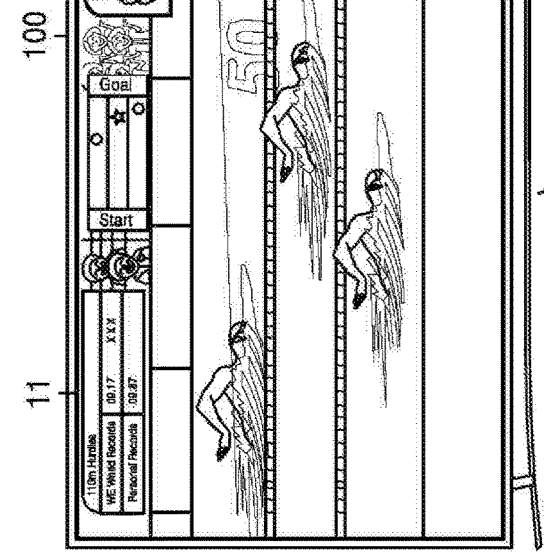
Figure 8:
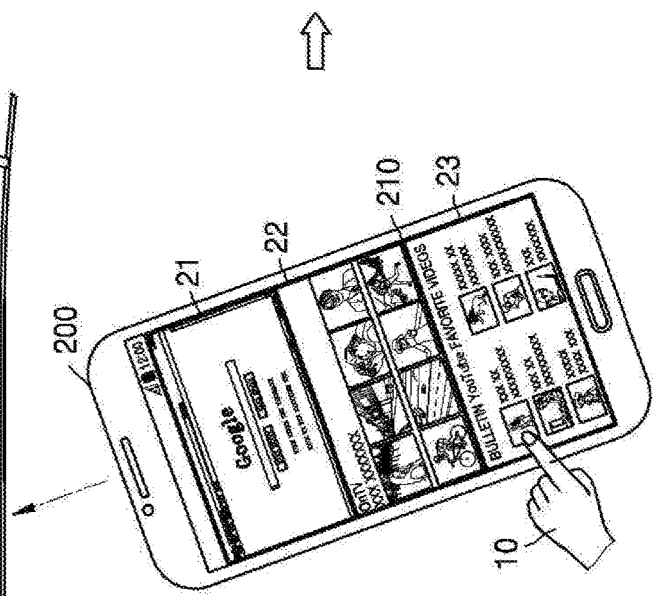

FIG. 8 illustrates examples of the display apparatus 100 that operates in the UI display limit mode and the control apparatus 200 that controls the display apparatus 100.

Referring to FIG. 8, the activated control apparatus 200 may receive an input for selecting one piece of image content from a user 10 via a UI 23. The input for selecting one piece of image content from the user 10 may be an exemplary embodiment of operation S450 of receiving the input of a control signal described with reference to FIG. 5. Referring to FIG. 8, the user 10 selects one piece of image content, for example, by touching it, but the touching method is only an example. The control apparatus 200 may receive an input to control the display apparatus 100 from the user 10, according to an input method that may be variously implemented.

As illustrated in FIG. 8, when the control apparatus 200 is activated, UIs 21, 22, and 23 to control the display apparatus 100 may be displayed on the control apparatus 200, and thus, it is not required to redundantly display UIs on the display apparatus 100. If the UIs are redundantly displayed on the display apparatus 100, the user 10 may have a difficulty in manipulating the display apparatus 100. If the UIs are redundantly displayed on the display apparatus 100, image content 11 that is currently being output may be obstructed by the UIs, and thus, the user 10 is limited in watching the image content 11. Therefore, according to at least one exemplary embodiment, a level of user satisfaction with respect to using the control apparatus 200 and the display apparatus 100 may be increased.

As illustrated in FIG. 8, when the user 10 selects one piece of image content via the control apparatus 200, the display apparatus 100 that has been outputting the image content 11 may be controlled to output other image content 15 selected via the control apparatus 200.

Figure 9:
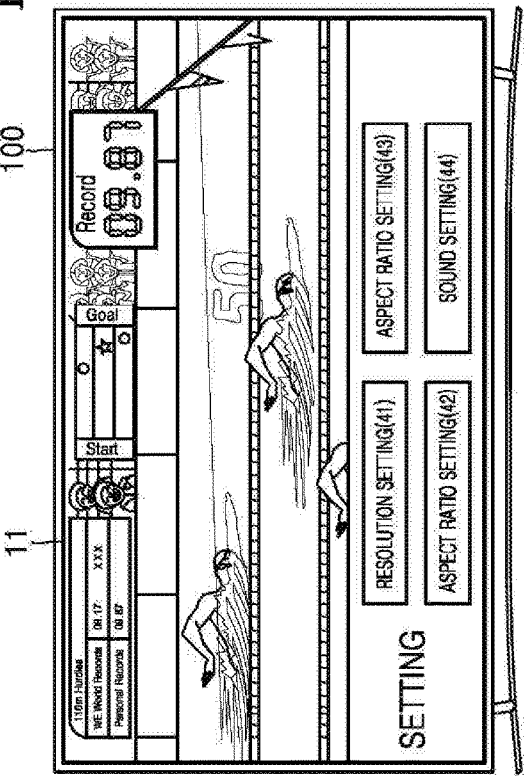
FIG. 9 illustrates an example in which the display apparatus that operates in the UI display mode changes its mode to the UI display limit mode.
Figure 9:
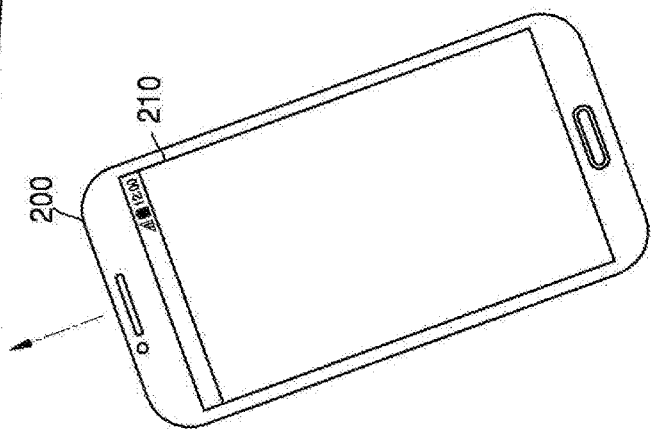
Figure 9:
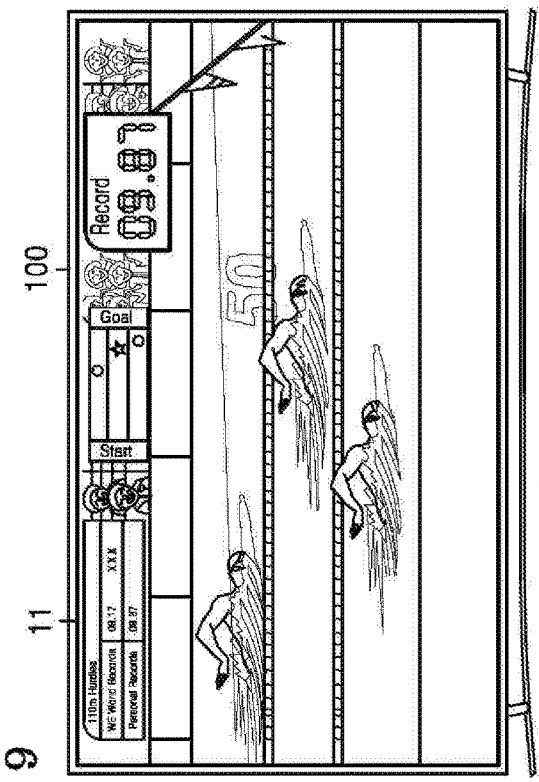
Figure 9:
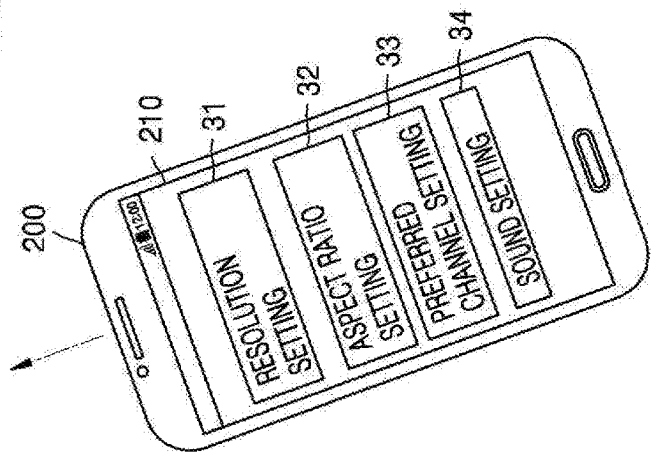

FIG. 9 illustrates an example in which the display apparatus 100 that operates in the UI display mode changes its mode to the UI display limit mode.

Referring to FIG. 9, the display apparatus 100 that operates in the UI display mode may output image content 11 and UIs 41, 42, 43, and 44. For example, the UIs 41, 42, 43, and 44 may be displayed to adjust setting of the display apparatus 100. As examples of the UIs 41, 42, 43, and 44, FIG. 9 illustrates a resolution setting window (the UI 41), an aspect ratio setting window (the UI 42), a preferred channel setting window (the UI 43), and a sound setting window (the UI 44). However, the examples of the UIs 41, 42, 43, and 44 are not limited to what are illustrated in FIG. 9.

The display apparatus 100 that operates in the UI display mode and thus outputs the image content 11 and the UIs 41, 42, 43, and 44 may receive a status signal indicating that the control apparatus 200 has been activated. The display apparatus 100 may change its mode to the UI display limit mode and thus may change its screen so as to output only the image content 11.

The display unit 210 of the activated control apparatus 200 may display UIs 31, 32, 33, and 34 for adjusting setting of the display apparatus 100. As examples of the UIs 31, 32, 33, and 34, FIG. 9 illustrates a resolution setting window (the UI 31), an aspect ratio setting window (the UI 32), a preferred channel setting window (the UI 33), and a sound setting window (the UI 34). The UIs 31, 32, 33, and 34 that are output to the control apparatus 200 may correspond to the UIs 41, 42, 43, and 44 that are output by the display apparatus 100 before the display apparatus 100 changes its mode to the UI display limit mode. The UIs 31, 32, 33, and 34 that are output to the display unit 210 of the control apparatus 200 may be used in adjusting setting of the display apparatus 100. FIG. 9 illustrates examples of one type of UI, but types of the UI are not limited thereto. The UIs 31, 32, 33, and 34 for adjusting setting of the display apparatus 100 may be output based on information received from the display apparatus 100.

Figure 10:
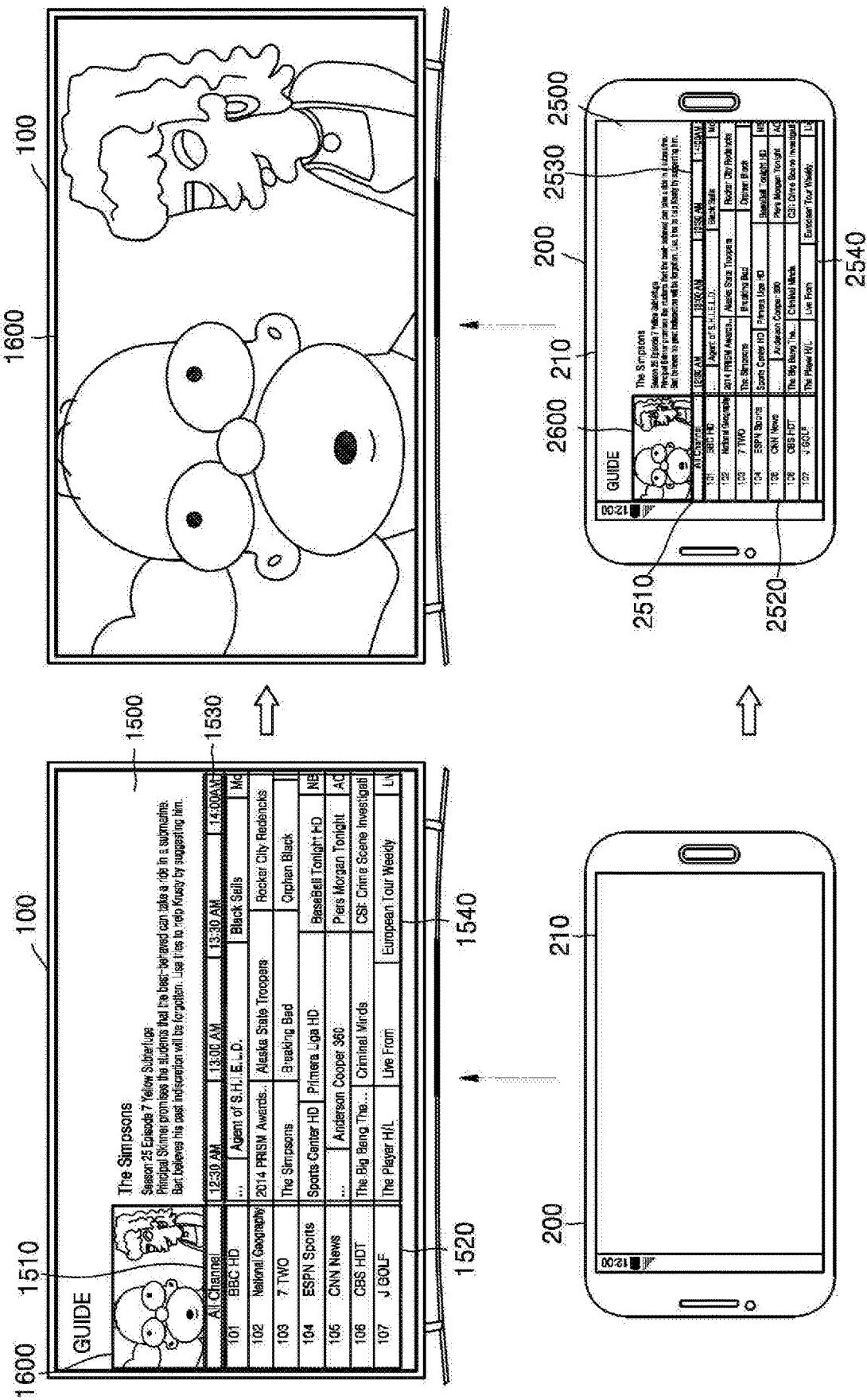
FIG. 10 illustrates an example in which the display apparatus that operates in the UI display mode changes its mode to the UI display limit mode.

FIG. 10 illustrates an example in which the display apparatus 100 that operates in the UI display mode changes its mode to the UI display limit mode.

Referring to FIG. 10, the display apparatus 100 that operates in the UI display mode may output not only image content 1600 but also may output UIs 1500, 1510, 1520, and 1530 that provide an EPG. The EPG or an interactive program guide provides a user with a menu that displays broadcasting programs or with scheduling information of a currently-broadcast program or a program to be broadcast. As examples of the UIs 1500, 1510, 1520, and 1530 that provide the EPG, FIG. 10 illustrates a content information area (the UI 1500) that provides information about the image content 1600 that is currently being output, a channel item (the UI 1510), a channel list (the UI 1520) that provides a list of selectable channels, time information (the UI 1530), and a program information area (the UI 1540) that provides information about programs broadcast in particular time slots. FIG. 10 illustrates examples of the UIs 1500, 1510, 1520, and 1530 that provide the EPG, but types of the UIs 1500, 1510, 1520, and 1530 are not limited thereto.

The display apparatus 100 that operates in the UI display mode and thus outputs the image content 1600 and the UIs 1500, 1510, 1520, and 1530 may receive a status signal indicating that the control apparatus 200 has been activated. The display apparatus 100 may change its mode to the UI display limit mode and thus may change its screen so as to output only the image content 1600.

The display unit 210 of the activated control apparatus 200 may display UIs 2500, 2510, 2520, and 2530 that provide an EPG of the display apparatus 100. FIG. 10 illustrates a content information area (the UI 2500) that provides information about the image content 1600 that is output to the display apparatus 100, a channel item (the UI 2510), a channel list (the UI 2520) that provides a list of selectable channels, time information (the UI 2530), and a program information area (the UI 2540) that provides information about programs broadcast in particular time slots. The UIs 2500, 2510, 2520, and 2530 that are output to the control apparatus 200 may correspond to the UIs 1500, 1510, 1520, and 1530 that are output by the display apparatus 100 before the display apparatus 100 changes its mode to the UI display limit mode. FIG. 10 illustrates only examples of one type of UI, but types of the UI are not limited thereto.

The activated control apparatus 200 may further output a content window 2600 that provides image content that is the same as the image content 1600 that is output to the display apparatus 100. However, since the image content 1600 is output to the display apparatus 100, the content window 2600 may not be output to the control apparatus 200. The content window 2600 may output a thumbnail image corresponding to the image content 1600 that is output to the display apparatus 100.

The control apparatus 200 may receive a user input and may transmit information related to the received user input to the display apparatus 100. An output from the display apparatus 100 may be controlled by the control apparatus 200. For example, the control apparatus 200 may select a channel from the channel list 2520, based on the user input. In this regard, the control apparatus 200 may transmit information about the selected channel to the display apparatus 100, and thus may change a channel output from the display apparatus 100.

To allow the user to recognize information about a mode during which the display apparatus 100 currently operates, the display apparatus 100 may output a window or a graphical item for notifying about the mode of the display apparatus 100.

Figure 11:
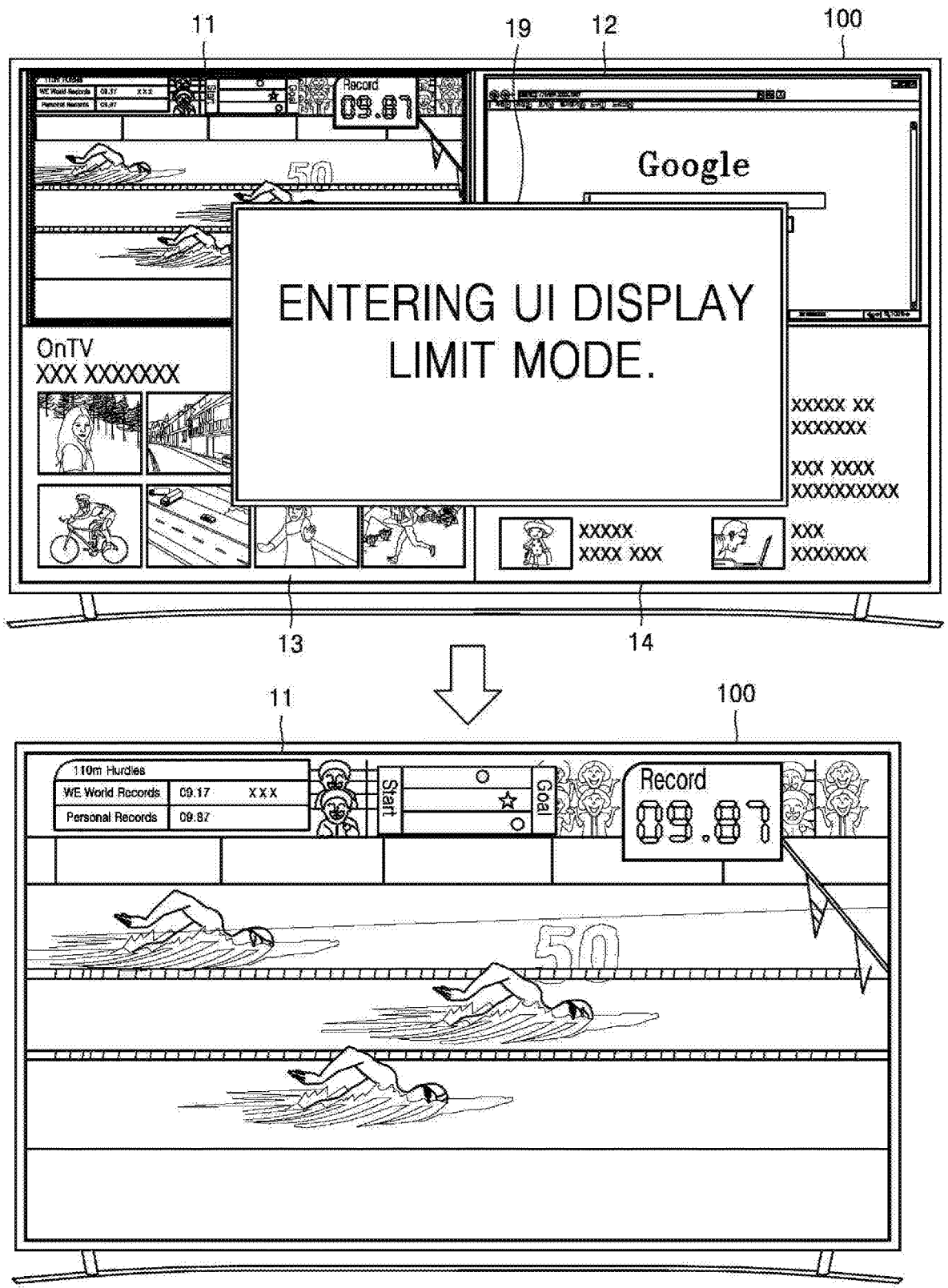
FIG. 11 illustrates an example in which the display apparatus outputs a window for notifying about an operation mode, according to at least one exemplary embodiment.

FIG. 11 illustrates an example in which the display apparatus 100 outputs a window for notifying about an operation mode, according to at least one exemplary embodiment.

Referring to FIG. 11, in a case where the display apparatus 100 that operates in the UI display mode and thus outputs image content 11 and UIs 12, 13, and 14 changes its mode to the UI display limit mode, before the display apparatus 100 enters the UI display limit mode, the display apparatus 100 may output a window 19 for notifying about a mode change. Referring to FIG. 11, the window 19 notifies, in a text form, that the display apparatus 100 is changed to the UI display limit mode, but the text form is just an example and the inventive concept is not limited thereto. As in the case of FIG. 11, even if the display apparatus 100 is changed from the UI display limit mode to the UI display mode, a window for notifying about a mode change may be output.

Figure 12:
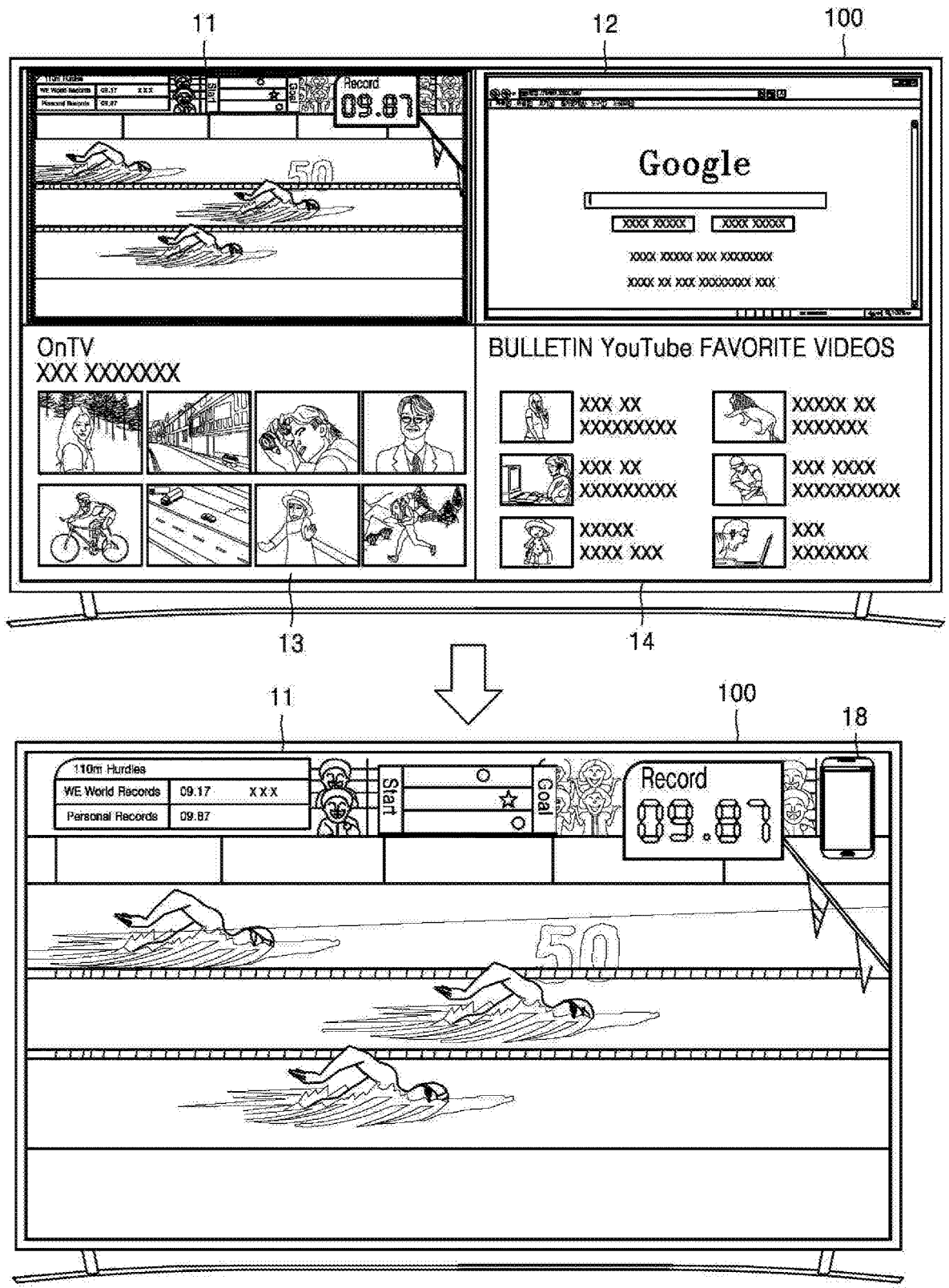
FIG. 12 illustrates an example in which the display apparatus outputs a graphical item for notifying about an operation mode, according to at least one exemplary embodiment.

FIG. 12 illustrates an example in which the display apparatus 100 outputs a graphical item for notifying about an operation mode, according to at least one exemplary embodiment.

Referring to FIG. 12, the display apparatus 100 that operates in the UI display mode and thus outputs image content 11 and UIs 12, 13, and 14 may change its mode to the UI display limit mode, due to activation of the control apparatus 200 (refer to FIG. 1). The display apparatus 100 changed to the UI display limit mode may output the image content 11. The display apparatus 100 may further output a graphical item 18 for notifying that a current mode is the UI display limit mode. Referring to FIG. 12, the graphical item 18 whose shape corresponds to a shape of the control apparatus 200 may be output, and may notify that the control apparatus 200 (as illustrated, for example, in FIG. 1) is activated. However, the graphical item 18 is not limited thereto and thus may be output in various combinations of texts and figures for notifying about a current mode of the display apparatus 100. Thus, a user may recognize a current mode of the display apparatus 100.

The graphical item 18 may be constantly output to a screen of the display apparatus 100 while the display apparatus 100 operates in the UI display limit mode. When the display apparatus 100 is changed to the UI display limit mode, the graphical item 18 may be output only for a preset time period and then may be made disappear.

As in the case illustrated in FIG. 12, even if the display apparatus 100 is changed from the UI display limit mode to the UI display mode, a graphical item to indicate the UI display mode may be output.

As in the case illustrated in FIG. 11, just before the display apparatus 100 enters a changed mode, the display apparatus 100 may output, to the screen of the display apparatus 100, the window 19 for notifying about the mode change. As in the case illustrated in FIG. 12, the display apparatus 100 may output the graphical item 18 indicating a current operation mode to a portion of the screen of the display apparatus 100 that operates in a changed mode.

Figure 13:
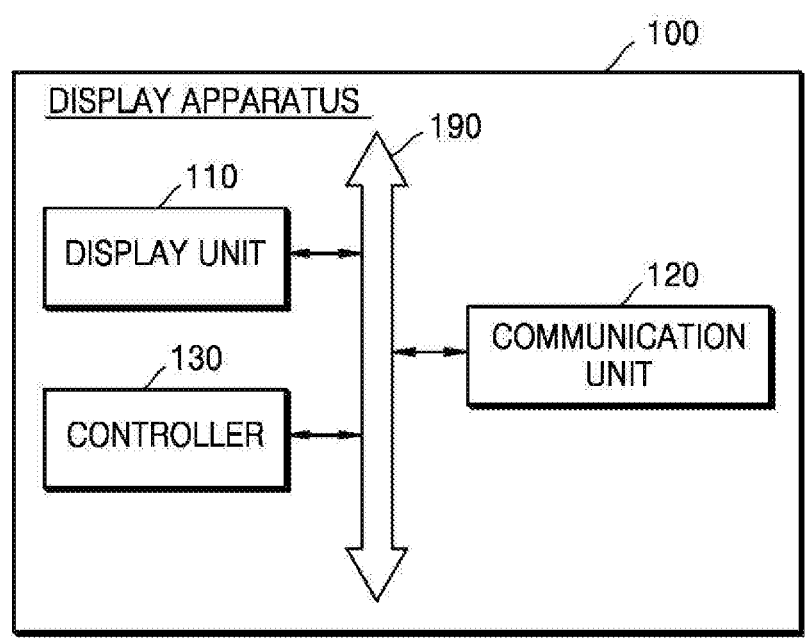
FIG. 13 illustrates a configuration of the display apparatus, according to at least one exemplary embodiment.

FIG. 13 illustrates a configuration of the display apparatus 100, according to at least one exemplary embodiment.

Referring to FIG. 13, the display apparatus 100 may include a display unit 110, a communication unit 120, and a controller 130. Various elements included in the display apparatus 100 may be connected to each other, for example, via a bus 190.

The display unit 110 may output, under control of the controller 130, image content, a UI, or the like. While the display apparatus 100 operates in the UI display limit mode, an output of the UI may be limited.

The communication unit 120 may communicate with the control apparatuses 200 and 300, for example, of FIG. 1. The communication unit 120 may receive a status signal from the control apparatus 200 of FIG. 1, or may receive various control signals from the control apparatuses 200 and 300. The communication unit 120 may receive a broadcasting signal or to receive image content from an external apparatus. The communication unit 120 may include one or more elements for allowing the display apparatus 100 to communicate with the external apparatus. For example, the communication unit 120 may include a short-distance communication module, a wired communication module, a wireless communication module, or the like.

The short-distance communication module may be defined as a module for short-distance communication between terminal devices including modules that are located within a preset distance. In at least one exemplary embodiment, examples of a short-distance communication technology may include, but are not limited to, a wireless LAN, Wi-Fi, Bluetooth, ZigBee, WFD, UWB, IrDA, BLE, NFC, or the like.

The wired communication module may be defined as a module for communication using an electrical signal or an optical signal, and examples of a wired communication technology may include a wired communication technology using a pair cable, a coaxial cable, an optical fiber cable, or the like, and may also include wired communication technologies that are obvious to one of ordinary skill in the art.

The wireless communication module may exchange a wireless signal with at least one of a base station, an external apparatus, and a server on a mobile communication network. Examples of the wireless signal may include various types of data according to communication of a sound call signal, a video call signal, or a text/multimedia message.

The controller 130 may control operations, e.g., all operations of the display apparatus 100, and may process various types of data for the operations of the display apparatus 100. The controller 130 may receive a signal that is received from the control apparatus 200 or the second control apparatus 300 via the communication unit 120. The controller 130 may select a mode from among a plurality of modes, based on the received signal, or may control an output from the display apparatus 100, based on the received signal.

The controller 130 may obtain a status signal indicating, for example, whether the control apparatus 200 (as illustrated in FIG. 1) is activated, from the control apparatus 200. Based on the status signal, the controller 130 may select one of the UI display limit mode and the UI display mode, and may operate the display unit 110 in the selected mode, wherein the UI display limit mode limits displaying a UI to control an output from the display apparatus 100 on the display unit 110, and the UI display mode does not limit displaying the UI on the display unit 110.

The controller 130 may obtain the status signal by sensing an on or off status of the display unit 210 (as illustrated in FIG. 1) of the control apparatus 200 (as illustrated in FIG. 1).

If the status signal indicates activation of the control apparatus 200, the controller 130 may operate the display unit 110 in the UI display limit mode that limits displaying the UI on the display unit 110. If the status signal indicates inactivation of the control apparatus 200, the controller 130 may operate the display unit 110 in the UI display mode that does not limit displaying the UI on the display unit 110.

The communication unit 120 may receive, from the control apparatus 200, a control signal to control an output from the display unit 110. If the control signal is received while the display unit 110 operates in the UI display limit mode, the controller 130 may control the output from the display unit 110, based on the control signal.

The communication unit 120 may receive, from the second control apparatus 300 (refer to FIG. 1), a second control signal to control an output from the display unit 110. If the second control signal is received while the display unit 110 operates in the UI display limit mode, the controller 130 may block the second control signal. if the second control signal is received while the display unit 110 operates in the UI display mode, the controller 130 may control the output from the display unit 110, based on the second control signal.

Control of the operations of the display apparatus 100, or data processing for the operations of the display apparatus 100, may be performed, e.g., all performed by the controller 130. The controller 130 may include a central processing unit (CPU), a microprocessor, a graphics processing unit (GPU), or the like.

Figure 14:
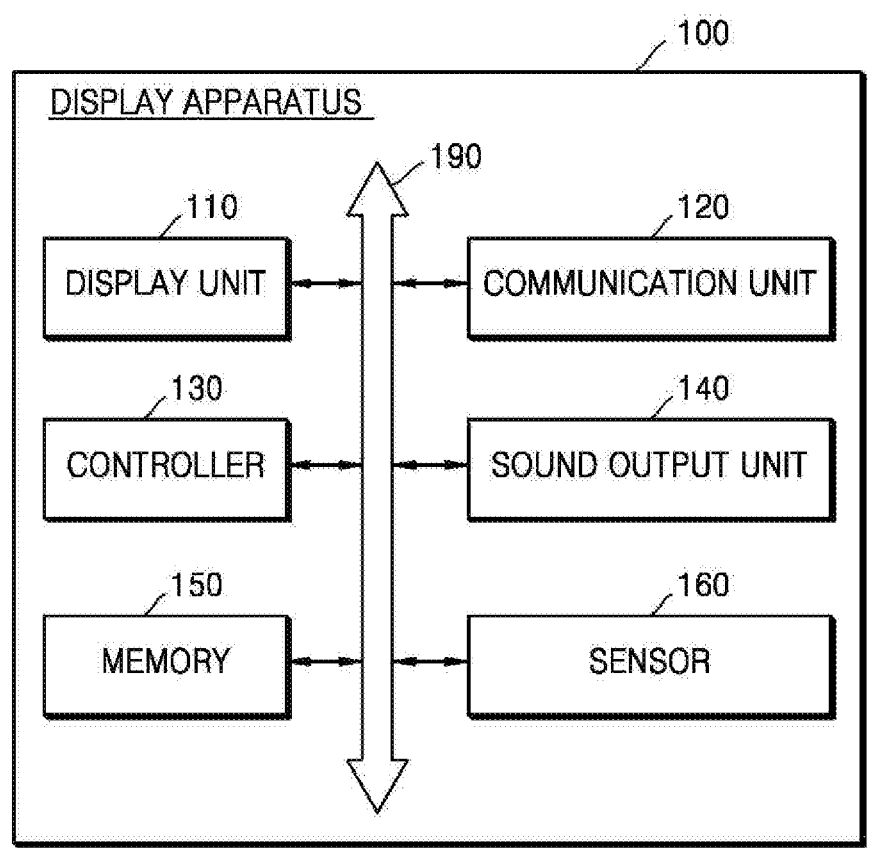
FIG. 14 illustrates a configuration of the display apparatus of FIG. 13, according to at least one exemplary embodiment.

FIG. 14 illustrates a configuration of the display apparatus 100 of FIG. 13, according to at least one exemplary embodiment.

Referring to FIG. 14, the display apparatus 100 may include the display unit 110, the communication unit 120, and the controller 130. The display apparatus may include a sound output unit 140 that may be embodied as a speaker, etc., a memory 150, and/or a sensor 160 that may sense a status signal.

Figure 15:
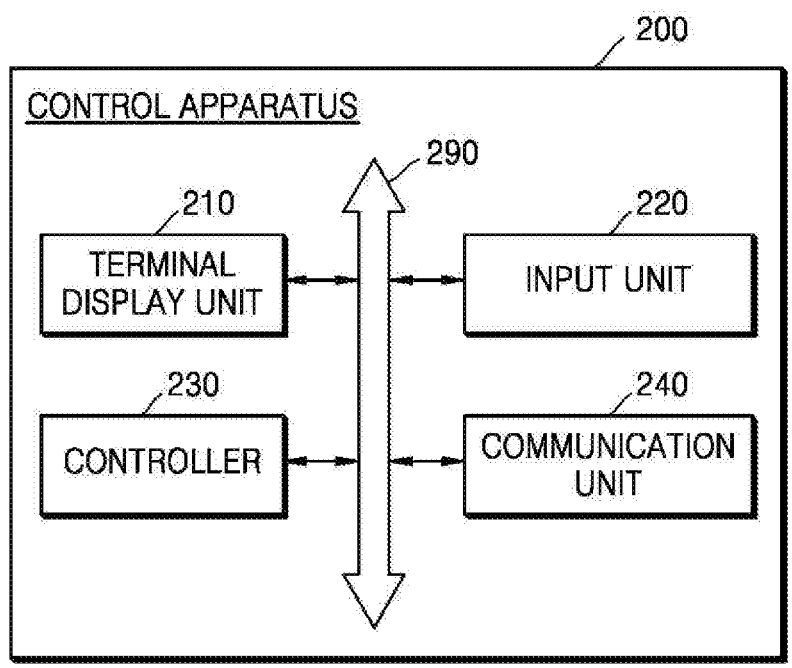
FIG. 15 illustrates a configuration of the control apparatus, according to at least one exemplary embodiment.

FIG. 15 illustrates a configuration of the control apparatus 200, according to at least one exemplary embodiment.

Referring to FIG. 15, the control apparatus 200 may include a terminal display unit 210, an input unit 220, a controller 230, and a communication unit 240. Various elements included in the control apparatus 200 may be connected to each other via a bus 290.

The communication unit 240 may communicate with the display apparatus 100 of FIG. 13 or external apparatuses. The communication unit 240 may transmit a status signal, a control signal, etc. to the display apparatus 100 of FIG. 13. Also, the communication unit 240 may receive a broadcasting signal or to receive image content from an external apparatus.

The terminal display unit 210 may output a UI for manipulation of the display apparatus 100 (refer to FIG. 13). The terminal display unit 210 is so named only to distinguish from the display unit 110 the display apparatus 100 of FIG. 13, and thus may also be referred to as the display unit 210.

The input unit 220 may receive an input of a command to manipulate the display apparatus 100 from a user. Examples of the input unit 220 may include a keyboard, a mouse, a touchscreen, a voice recognizer, a fingerprint recognizer, or an iris recognizer, and may also include input apparatuses that are obvious to one of ordinary skill in the art.

The controller 230 may generally control all operations of the control apparatus 200, and may process various types of data for the operations of the control apparatus 200. The controller 230 may obtain a status signal, a control signal, etc., based on a user input, and may control the obtained signals to be transmitted to the display apparatus 100 (refer to FIG. 13) via the communication unit 240.

The controller 230 may control the terminal display unit 210 to output, based on the status signal, a UI to control an output from the display apparatus 100 (refer to FIG. 13).

The status signal may indicate activation or inactivation of a control function of the control apparatus 200. The activation or inactivation of the control function may be determined according to an on or off status of the terminal display unit 210. The terminal display unit 210 may be turned off according to a user's command input via the input unit 220, or may be turned off if there is no input from a user via the input unit 220 for a preset time period.

Control of the operations of the control apparatus 200 described above with reference to the drawings, or data processing for the operations of the control apparatus 200 may be all performed by the controller 230. The controller 230 may include a CPU, a microprocessor, a GPU, or the like.

Figure 16:
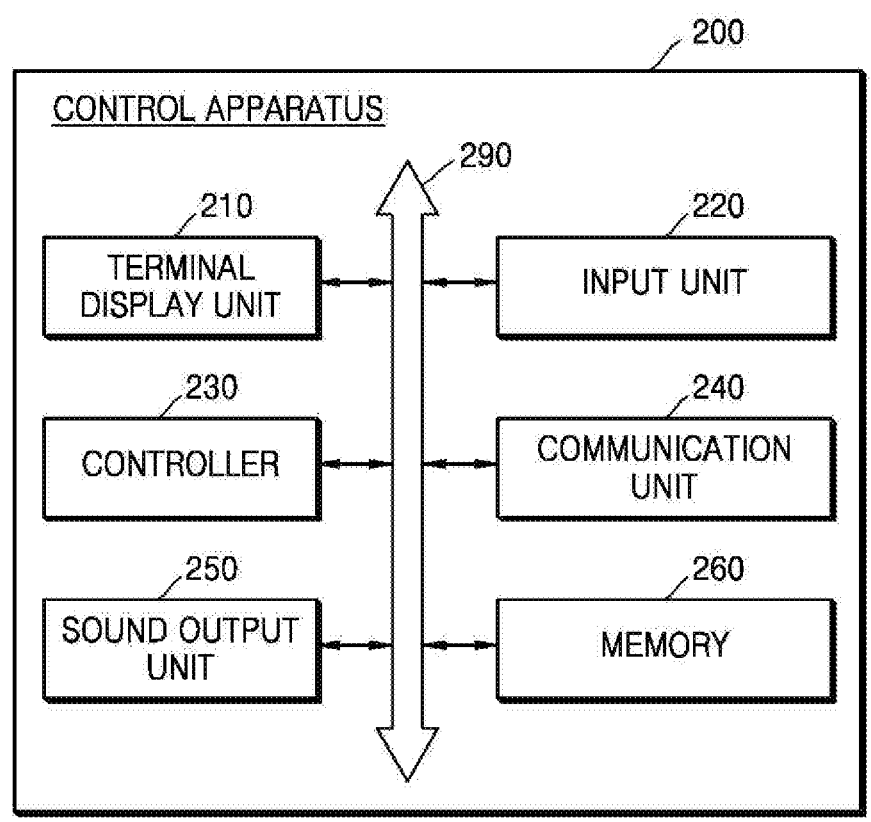
FIG. 16 illustrates a configuration of the control apparatus of FIG. 15, according to at least one exemplary embodiment.

FIG. 16 illustrates a configuration of the control apparatus 200 of FIG. 15, according to at least one exemplary embodiment.

Referring to FIG. 16, the control apparatus 200 may include the terminal display unit 210, the input unit 220, the controller 230, and the communication unit 240, and may further include a sound output unit 250 that may be embodied as a speaker, etc., and a memory 260. The memory 260 may store information for outputting a UI, or the like.

According to at least one exemplary embodiment, an operation mode of the display apparatus 100 (refer, for example, to FIG. 1) may be automatically set according to a status of the control apparatus 200 including the display unit 210. Therefore, an appropriate operation mode of the display apparatus 100 may be automatically set according to the status of the control apparatus 200. According to at least one exemplary embodiment, a priority may be allocated to the control apparatus 200 including the display unit 210 from among different types of control apparatuses (refer, for example, to the control apparatuses 200 and 300 of FIG. 1) that differ in terms of whether the control apparatuses include a display unit. Therefore, even if more than one control apparatuses are simultaneously used, an operational error of the display apparatus 100 may be prevented. Also, confusion experienced by a user may be prevented, and thus, user convenience may be increased. In addition, a user's experience with respect to the control apparatus 200 that is a new electronic apparatus, and an existing experience with respect to the second control apparatus 300 that is a conventional-type electronic apparatus may be facilitated.

At least one of the exemplary embodiments can be written as a computer program and can be implemented in a general-use digital computer that may execute the programs using a non-transitory computer readable recording medium.

Examples of the non-transitory computer readable recording medium include magnetic storage media (e.g., ROM, floppy disks, hard disks, etc.), optical recording media (e.g., CD-ROMs, or DVDs), etc.

While the one or more exemplary embodiments of the inventive concept have been illustrated and described with reference to drawings thereof, it will be understood by one of ordinary skill in the art that various changes in form and details may be made therein without departing from the spirit and scope of the inventive concept as defined by the appended claims. The one or more exemplary embodiments should be considered in a descriptive sense only and not for purposes of limitation. Therefore, the scope of the inventive concept is defined not by the detailed description but by the appended claims, and all differences within the scope will be construed as being included in the inventive concept.

Although a few embodiments have been illustrated and described, it would be appreciated by those skilled in the art that changes may be made in these embodiments without departing from the principles and spirit of the invention, the scope of which is defined in the claims and their equivalents.

What is claimed is:

1. An electronic apparatus comprising:
  a display;
  a communication circuitry;
  a controller configured to:
    establish a connection with a display apparatus via the communication circuitry, and
    transmit, to the display apparatus, a status signal indicating one of an on status or an off status of the display of the electronic apparatus via the communication circuitry while the connection between the electronic apparatus and the display apparatus is established, the on status of the display indicating that the display is powered on status, and the off status of the display indicating that the display is powered off status,
    wherein the status signal indicating the off status of the display of the electronic apparatus allows the display apparatus to display on a display of the display apparatus a graphical user interface for receiving a user input to manipulate the display apparatus while the display apparatus displays a content image, and
    the status signal indicating the on status of the display of the electronic apparatus prevents the display apparatus from displaying the graphical user interface on the display of the display apparatus while the display apparatus displays a content image, and allows the display apparatus to transmit information on the graphical user interface to the electronic apparatus for receiving a user input for manipulating the display apparatus from the electronic apparatus.

2. The electronic apparatus of claim 1, further comprising an input interface that receives, from a user, a control signal to manipulate the display apparatus, and
  wherein the communication circuitry is further configured to transmit the control signal to the display apparatus.

3. The electronic apparatus of claim 2, wherein the display is configured to be turned off according to a command of the user that is input via the input interface, or is configured to be turned off if the electronic apparatus does not receive an input from the user via the input interface for a predefined time period.

4. The electronic apparatus of claim 1, further comprising a memory that stores information for outputting the UI.

5. An operating method of an electronic apparatus including a display, comprising:
  establishing a connection with a display apparatus, and
  transmitting, to the display apparatus, a status signal indicating one of an on status or an off status of the display of the electronic apparatus while the connection between the electronic apparatus and the display apparatus is established, the on status of the display indicating that the display is powered on status, and the off status of the display indicating that the display is powered off status,
  wherein the status signal indicating the off status of the display of the electronic apparatus allows the display apparatus to display on a display of the display apparatus a graphical user interface for receiving a user input to manipulate the display apparatus while the display apparatus displays a content image, and
  the status signal indicating the on status of the display of the electronic apparatus prevents the display apparatus from displaying the graphical user interface on the display of the display apparatus while the display apparatus displays a content image, and allows the display apparatus to transmit information on the graphical user interface to the electronic apparatus for receiving a user input for manipulating the display apparatus from the electronic apparatus.

6. The operating method of claim 5, further comprising:
  receiving, via an input interface, from a user, a control signal to manipulate the display apparatus, and
  transmitting the control signal to the display apparatus.

7. The operating method of claim 6, wherein the display is configured to be turned off according to a command of the user that is input via the input interface, or is configured to be turned off if the electronic apparatus does not receive an input from the user via the input interface for a predefined time period.

8. The operating method of claim 5, further comprising storing information for outputting the UI in a memory.

9. A non-transitory computer-readable recording medium having recorded thereon a program for executing an operating method of an electronic apparatus including a display, the operating method comprising:
  establishing a connection with a display apparatus via the communication circuitry, and
  transmitting, to the display apparatus, a status signal indicating one of an on status or an off status of the display of the electronic apparatus while the connection between the electronic apparatus and the display apparatus is established, the on status of the display indicating that the display is powered on status, and the off status of the display indicating that the display is powered off status,
  wherein the status signal indicating the off status of the display of the electronic apparatus allows the display apparatus to display on a display of the display apparatus a graphical user interface for receiving a user input to manipulate the display apparatus while the display apparatus displays a content image, and
  the status signal indicating the on status of the display of the electronic apparatus prevents the display apparatus from displaying the graphical user interface on the display of the display apparatus while the display apparatus displays a content image, and allows the display apparatus to transmit information on the graphical user interface to the electronic apparatus for receiving a user input for manipulating the display apparatus from the electronic apparatus.

10. The non-transitory computer-readable recording medium of claim 9, the operating method further comprising:

receiving, via an input interface, from a user, a control signal to manipulate the display apparatus, and
transmitting the control signal to the display apparatus.

11. The non-transitory computer-readable recording medium of claim 10, wherein the display is configured to be turned off according to a command of the user that is input via the input interface, or is configured to be turned off if the electronic apparatus does not receive an input from the user via the input interface for a predefined time period.

12. The non-transitory computer-readable recording medium of claim 9, the operating method further comprising: storing information for outputting the UI in a memory.

* * * * *